US008966569B2

(12) United States Patent
Schwartz et al.

(10) Patent No.: US 8,966,569 B2
(45) Date of Patent: Feb. 24, 2015

(54) COLLABORATIVE STRUCTURED ANALYSIS SYSTEM AND METHOD

(75) Inventors: Alan Schwartz, Washington, DC (US); Katherine Pherson, Great Falls, VA (US); Diana Manfredi, Sterling, VA (US); Grace Scarborough, Great Falls, VA (US); Randolph Pherson, Great Falls, VA (US); Sarah Beebe, Herndon, VA (US); Karl Ginter, Beltsville, MD (US); Mike Bartman, Beltsville, MD (US)

(73) Assignee: Globalytica, LLC, Reston, VA (US)

( * ) Notice: Subject to any disclaimer, the term of this patent is extended or adjusted under 35 U.S.C. 154(b) by 274 days.

(21) Appl. No.: 13/192,425

(22) Filed: Jul. 27, 2011

(65) Prior Publication Data

US 2012/0030729 A1 Feb. 2, 2012

Related U.S. Application Data

(60) Provisional application No. 61/400,345, filed on Jul. 27, 2010, provisional application No. 61/402,159, filed on Aug. 25, 2010.

(51) Int. Cl.
*G06F 21/00* (2013.01)
*G06Q 10/06* (2012.01)
*G06Q 10/10* (2012.01)

(52) U.S. Cl.
CPC .......... *G06Q 10/0633* (2013.01); *G06Q 10/103* (2013.01)
USPC .................................................. 726/1; 726/2

(58) Field of Classification Search
CPC .. G06Q 10/06; G06Q 10/103; G06Q 10/0633
USPC ............................................................ 726/1
See application file for complete search history.

(56) References Cited

U.S. PATENT DOCUMENTS

| 7,581,011 B2 * | 8/2009 | Teng ............................. 709/229 |
| 7,644,056 B2 | 1/2010 | Khalsa |

(Continued)

OTHER PUBLICATIONS

Pope, Worknotes: Sheba, 2008.

(Continued)

*Primary Examiner* — Linglan Edwards
(74) *Attorney, Agent, or Firm* — David P. Lentini

(57) ABSTRACT

Methods, systems, and apparatus for providing compartmented, collaborative, integrated, automated analytics to analysts are provided. In a first aspect, the present invention provides a computer-implemented method for providing compartmented, collaborative, integrated, automated analytics to analysts including: selecting a computer-encoded project-specific workflow; determining a computer-encoded compartment manager, said computer-encoded compartment manager including computer-encoded information about the context of said project-specific workflow; retrieving said computer-encoded information about the context; selecting a computer-implemented automated analytic using said computer-encoded project-specific workflow; providing under control of said computer-encoded compartment manager said information about the context to said automated analytic; processing said computer-encoded information using said computer-implemented automated analytic, to generate thereby analytical information representing an outcome to said analysts; and processing said analytical information in accordance with said computer-encoded compartment manager and said computer-encoded project-specific workflow.

24 Claims, 10 Drawing Sheets

(56) References Cited

U.S. PATENT DOCUMENTS

| | | | |
|---|---|---|---|
| 7,720,787 | B2 | 5/2010 | Pope et al. |
| 7,761,809 | B2* | 7/2010 | Bukovec et al. ............... 715/810 |
| 7,917,535 | B1* | 3/2011 | Gregory et al. ............... 707/791 |
| 7,966,254 | B2* | 6/2011 | Cavey ............................ 705/39 |
| 8,353,005 | B2* | 1/2013 | Kabat et al. ..................... 726/2 |
| 8,478,715 | B2* | 7/2013 | Dorrell et al. ................. 707/603 |
| 8,646,027 | B2* | 2/2014 | Malaviarachchi et al. ....... 726/1 |
| 8,768,741 | B1* | 7/2014 | Hinton et al. ................ 705/7.27 |
| 2002/0152254 | A1* | 10/2002 | Teng ............................. 709/100 |
| 2006/0117067 | A1 | 6/2006 | Wright et al. |
| 2006/0190310 | A1 | 8/2006 | Gudla |
| 2007/0127793 | A1 | 6/2007 | Beckett |
| 2007/0220479 | A1* | 9/2007 | Hughes ......................... 717/100 |
| 2007/0299862 | A1 | 12/2007 | Aggarwal |
| 2008/0235045 | A1* | 9/2008 | Suzuki et al. ..................... 705/1 |
| 2009/0222882 | A1* | 9/2009 | Kabat et al. ...................... 726/1 |
| 2009/0287675 | A1 | 11/2009 | Dorrell |
| 2010/0088125 | A1* | 4/2010 | Vaughan et al. .................. 705/4 |
| 2010/0095373 | A1* | 4/2010 | Levenshteyn et al. .......... 726/21 |

OTHER PUBLICATIONS

Heuer, Jr., The Future of "Alternative Analysis", Jan. 9, 2007, Pherson Associates, LLC.

Collaborative Analysis of Competing Hypotheses (C-ACH), 2007, Pherson Associates, LLC.

The Open Source Analysis of Competing Hypotheses Project.

User Manual—The Open Source Analysis of Competing Hypotheses Project.

Good et al, Acho: A Tool for Analyzing Competing Hypotheses, Palo Alto Research Center, Oct. 13, 2004.

Heuer et al, Structured Analytic Techniques for Intelligence Analysis, 2010, pp. 343, CQ Press, ISBN: 978-1-60871-018-8.

Convertino et al, The CACHE Study: Group Effects in Computer-supported Collaborative Analysis, Computer Supported Cooperative Work (CSCW), 2008, vol. 17, No. 4, pp. 353-393, DOI 10.1007/s10606-008-9080-9.

Billman et al, Collaborative Intelligence Analysis with CACHE and its Effects on Information Gathering and Cognitive Bias, Human Computer Interaction Consortium Workshop, 2006.

Shrager et al, Multistage Collaboration in CACHE: The Bayes Community Model, Nov. 25, 2006.

Pope et al, Formal Methods of Countering Deception and Misperception in Intelligence Analysis, 11th International Command and Control Research and Technology Symposium (ICCRTS), 2006.

ACH2.0.5 Download Page, Nov. 9, 2006, Palo Alto Research Center.

Wheaton et al, Structured Analysis of Competing Hypotheses: Improving a Tested Intelligence Methodology, Competitive Intelligence Magazine, Nov. 2006, vol. 9, No. 6, pp. 12-15.

Cluxton et al, Decide Hypothesis Visualization Tool, Proc. Intl. Conf. on Intelligence Analysis 2005, 2005.

Pope et al, Analysis of Competing Hypotheses using Subjective Logic, 10th International Command and Control Research and Technology Symposium, 2005.

Stech et al, Deception Detection by Analysis of Competing Hypotheses, 2005 International Conference of Intelligence Analysis, May 12, 2005.

International Search Report and Written Opinion, mailed Dec. 16, 2011.

* cited by examiner

| S\I | A | B | C | Score |
|---|---|---|---|---|
| A1 | HL | C | U | 6 |
| A2 | L | HU | HU | 10 |
| A3 | L | C | L | 1 |
| B1 | C | HL | L | 3 |
| B2 | HL | HL | HL | 0 |
| B3 | U | HL | C | 6 |
| C1 | L | C | L | 1 |
| C2 | HL | L | HL | 1 |

HL
| | |
|---|---|
| HL | 0 |
| L | 1 |
| C | 2 |
| U | 4 |
| HU | 6 |

L
| | |
|---|---|
| HL | 0 |
| L | 0 |
| C | 1 |
| U | 3 |
| HU | 5 |

FIGURE 10

COLLABORATIVE STRUCTURED ANALYSIS SYSTEM AND METHOD

1 CROSS-REFERENCE TO RELATED U.S. PATENT APPLICATIONS

The present application claims priority under 35 U.S.C. §119(e) to provisional U.S. Patent Application Ser. No. 61/400,345 filed Jul. 27, 2010; and to provisional U.S. Patent Application Ser. No. 61/402,159 filed Aug. 25, 2010. Each of the aforementioned patent applications is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2011 Globalytica, LLC.

3 BACKGROUND OF THE INVENTION

3.1 Field of the Invention

The exemplary illustrative technology herein relates to systems, software, and methods for making analytical judgments. It is particularly useful for issues that require weighing of alternative explanations of what has happened, is happening, or is likely to happen in the future. The present invention has applications in the areas of business and intelligence analysis, criminal forensics, cognitive psychology, computer science, economics, decision theory, information processing and analysis, and management.

3.2 The Related Art

Analytic activities involve processes to generate hypotheses, to collect and record known relevant information, to categorize relevant information as to diagnosticity, reliability, or other factors, to test hypotheses by comparing the hypothesis against relevant information to determine those hypotheses that are supported by the relevant information and those that are not, and to determine and validate indicators for use in acquiring additional relevant information. Analytic activities can be classified as manual, automation assisted, and automated. Manual analytic activities are those that are performed solely by an analyst, automation assisted analytic activities are performed by an analyst with automation assistance, and automated analytic activities are those activities performed solely by a computer.

Relevant information is information used in analytic activities to determine which hypotheses are likely, and which are not, or to suggest one or more hypotheses to consider. Relevant information can be physical evidence, the information gained from analysis of physical evidence, witness reports, photographs, videos, audio recordings, transcripts of visual or audio recordings, expert testimony, deductions based on other relevant information, computer data, or any other information that can be used to support one or more hypotheses, to show lack of support for one or more hypotheses, or to suggest one or more possible hypothesis. Where relevant information is absent, but might be expected to be present, the lack of relevant information can also constitute relevant information. For example, if an aircraft was stolen from an airfield, it would be expected that the tower records would show a departure by that aircraft around the time it went missing from the airfield. If there is no such departure located, that lack is relevant information in itself, and might support hypotheses that the aircraft was hidden at the airfield rather than stolen, that it was disassembled and removed by truck, or that it was never present in the first place, while at the same time reducing support for hypotheses that include the idea of the aircraft being flown away by thieves.

Indicators are observable, or potentially observable, actions, conditions, or events that can be monitored to collect relevant information over time. Specific indicators occurring or reaching pre-determined values will support a conclusion that one or more specific hypotheses has happened, is happening, or is becoming more likely to happen, while if they do not occur or do not reach the pre-determined values, will support a conclusion that one or more hypotheses did not happen, are not happening, or are less likely to happen.

Analytic activities typically start by generating a set of hypotheses. The set of hypotheses generated ideally includes all reasonable hypotheses. There are a number of known manual techniques for generating hypotheses, including, but not limited to, Structured Brainstorming, Nominal Group Technique, the Delphi Method, Multiple Hypotheses Generation and Quadrant Hypothesis Generation. The specific manual hypothesis generation technique selected varies with the training of the analyst(s), and to some degree, the appropriateness of the technique to the situation. There are no known examples of automated or automation-assisted hypothesis generation. Given the number of steps and calculations involved in carrying out some of the manual techniques, and the amount of information involved in some steps, the chance for analysts to make errors is high. Automation of hypothesis generation would help to reduce the chance for such errors as well as easing analyst workload and significantly speeding up the analysis processes.

When generating hypotheses, it is necessary to avoid various types of bias that analysts are prone to which can limit or distort the scope of the generated hypotheses and adversely impact the conclusions reached. Some techniques for hypothesis generation have been developed help to avoid some types of bias, but introduce other types of bias. Ways to avoid or limit the effects of bias are needed.

When testing hypotheses as part of analytic activities, it is also necessary to avoid various types of bias. Structured analytic techniques, such as Analysis of Competing Hypotheses (ACH), have been developed to reduce some bias effects. Using the ACH technique manually is tedious and repetitive, time consuming, does not scale well for large numbers of hypotheses and relevant information due to the increasing size of the matrix that results, and does not deal well with a plurality of analysts since they must either share one matrix and agree on consistency ratings, or work individually and then manually merge their consistency ratings or debate their individual conclusions afterward. When analysts are co-located, the need to share a single matrix, or manually merge separate results, can also result in "groupthink" bias, as some analysts are improperly influenced in their determinations by the opinions of other analysts for reasons such as seniority, respect, dislike or other factors.

Each of these techniques can be complex and are slow and awkward to implement manually without error due to the quantity of information involved and the number of steps and calculations needed. Existing automation-assisted ACH programs, such as Open Source ACH, address the mechanics of the data recording aspects of the technique, and perform some of the calculations required. These programs accentuate biases, such as "anchoring" (i.e. fixating on a first reasonable choice and comparing subsequent choices to it). They do not support ways to reduce bias effects such as anchoring or "groupthink", do not support the compartmentalization of information, nor do they support automated mechanisms for generating hypotheses, do not permit flexible weighting of inputs by analysts (for example, to allow for varying levels of experience of the analyst), nor support distinguishing analysts and results reflecting domain-specific knowledge, and do not support other aspects of analytic activities, such as identification and evaluation of indicators, or generation of hypotheses, nor do they provide means to track analyst progress in rating consistency of hypotheses with relevant information, especially when analysts work independently in separate matrices. When performing manual analytic activities, collaboration between analysts typically requires that they be co-located, both for communication and to have access to the working materials, such as white boards, charts, papers, and other means used to record and organize information.

When collaborating during manual analytic activities, it can be difficult or impossible to maintain compartmentalization of information. Systems and devices to enable easier collaboration between analysts, whether co-located or in diverse locations, while maintaining proper compartmentalization of information, are needed.

Hypotheses or indicators that are common to more than one analytic technique must be manually copied or entered each time a different analytic technique is used to work with them. Doing so with pencil and paper, or even computerized spreadsheets, is awkward, time consuming and prone to error and does not support shared collaborations and compartmentalization of information. Analyst notes, assumptions, or discussions are not retained or associated with specific information, or even recorded in the first place, making it difficult or impossible to obtain a complete view of the history of a hypothesis, indicator, or item of relevant information. Such historical views of these items can provide insight useful for evaluating the quality of the ultimate conclusions of an analytic project. A means of automating and integrating the analytic techniques, with automation to reduce the workload required to implement the individual techniques, that collects and retains historical information about the origin and handling of important aspects of the analysis, is needed to improve the usability of the analysis processes, as well as to increase the quality of results.

Extensible, automated systems are needed for hypothesis generation, hypothesis recording, relevant information recording, hypothesis and relevant information sharing, hypothesis evaluation, indicator recording and evaluation, and analytic history recording, all while maintaining required compartmentalization of information. Automated and automation-assisted methods are needed to reduce analyst workload, reduce the likelihood of errors, to assist with identification and recognition of important relationships, such as which hypotheses a given piece of relevant information relates to, which hypotheses are inconsistent with what relevant information, or the reliability of a given piece of relevant information or its source.

The present invention addresses these and other needs.

4 SUMMARY OF THE INVENTION

The present invention provides methods, systems, and apparatus for providing compartmented, collaborative, integrated, automated analytics to analysts. As those having ordinary skill in the art will understand upon reading herein, the methods, systems, apparatus provided by the present invention enable extensible, automated systems are needed for hypothesis generation, hypothesis recording, relevant information recording, hypothesis and relevant information sharing, hypothesis evaluation, indicator recording and evaluation, and analytic history recording, all while maintaining required compartmentalization of information for various purposes.

In a first aspect, the present invention provides a computer-implemented method for providing compartmented, collaborative, integrated, automated analytics to analysts. In one embodiment, the method provided by the invention comprises selecting a computer-encoded project-specific workflow; determining a computer-encoded compartment manager, said computer-encoded compartment manager including computer-encoded information about the context of said project-specific workflow; retrieving said computer-encoded information about the context; selecting a computer-implemented automated analytic using said computer-encoded project-specific workflow; providing under control of said computer-encoded compartment manager said information about the context to said automated analytic; processing said computer-encoded information using said computer-implemented automated analytic, to generate thereby analytical information representing an outcome to said analysts; and processing said analytical information in accordance with said computer-encoded compartment manager and said computer-encoded project-specific workflow. In a more specific embodiment, the project-specific workflow includes at least one project-specific attribute selected from the group consisting of: guidance to the automated analytics, as to the process to be followed, information to use as inputs, information required for outputs, and any required labeling, tagging, and compartmentalization. In a still more specific embodiment, guidance to the automated analytics further includes guidance for analysts.

In still another embodiment, the project-specific workflow defines rules based upon one or more aspects of the context. In a more specific embodiment, the project-specific workflow defines rules for each analyst, each project, for each installation of the system, or by the system design.

In another embodiment, the computer-encoded context manager executes under computer control at least one function selected from the group consisting of: generating or assigning tags associated with specific information elements, or with specific types of information elements within a compartment; generating or assigning compartments associated with specific information elements, or with specific types of information elements within a compartment; managing requests to, and information elements provided by, a data store to enforce rules for information access, tagging, and association rules; assigning or associating information elements or types of information elements with specific tags, associations, controls, contexts, or compartments; assigning or associating rules with information elements or types of information elements that require specific tagging or restrictions to be applied to newly created information elements and restricting the availability of information elements or types of information elements to which a requestor is not authorized access or use.

In still another embodiment, the computer-encoded context manager executes under computer control at least one function selected from the group consisting of: implementing access controls over information elements; implementing controls over tagging and association among multiple information elements; and enforcing information segregation of information elements, including logical and physical segregation of information elements among different data stores.

Yet another embodiment further comprising providing a set of rules defining the scope of visibility of information, the rules being effective to define private information, restricted information, and unrestricted information.

In another aspect, the present invention provides a computer-implemented system for providing compartmented, collaborative, integrated, automated analytics to analysts. In one embodiment, the system comprises a computer-controlled service configured to select a computer-encoded project-specific workflow; a computer-controlled service configured to determine a computer-encoded compartment manager, the computer-encoded compartment manager including computer-encoded information about the context of the project-specific workflow; a computer-controlled service configured to retrieve the computer-encoded information about the context; a computer-controlled service configured to select computer-implemented automated analytic using the computer-encoded project-specific workflow; a computer-controlled service configured to provide under control of the computer-encoded compartment manager the information about the context to the automated analytic; a computer-controlled service configured to process the computer-encoded information using the computer-implemented automated analytic, to generate thereby analytical information representing an outcome to the analysts; and a computer-controlled service configured to process the analytical information in accordance with the computer-encoded compartment manager and the computer-encoded project-specific workflow.

In a more specific embodiment, the project-specific workflow includes at least one project-specific attribute selected from the group consisting of: guidance to the automated analytics, as to the process to be followed, information to use as inputs, information required for outputs, and any required labeling, tagging, and compartmentalization. In a still more specific embodiment, guidance to the automated analytics further includes guidance for analysts.

In still another embodiment, the project-specific workflow defines rules based upon one or more aspects of the context. In a more specific embodiment, the project-specific workflow defines rules for each analyst, each project, for each installation of the system, or by the system design.

In another embodiment, the computer-encoded context manager executes under computer control at least one function selected from the group consisting of: generating or assigning tags associated with specific information elements, or with specific types of information elements within a compartment; generating or assigning compartments associated with specific information elements, or with specific types of information elements within a compartment; managing requests to, and information elements provided by, a data store to enforce rules for information access, tagging, and association rules; assigning or associating information elements or types of information elements with specific tags, associations, controls, contexts, or compartments; assigning or associating rules with information elements or types of information elements that require specific tagging or restrictions to be applied to newly created information elements and restricting the availability of information elements or types of information elements to which a requestor is not authorized access or use.

In still another embodiment, the computer-encoded context manager executes under computer control at least one function selected from the group consisting of: implementing access controls over information elements; implementing controls over tagging and association among multiple information elements; and enforcing information segregation of information elements, including logical and physical segregation of information elements among different data stores.

Yet another embodiment further comprising providing a set of rules defining the scope of visibility of information, the rules being effective to define private information, restricted information, and unrestricted information.

In still another aspect, the present invention provides a computer-readable medium containing computer-readable program control devices thereon, the computer-readable program control devices being configured to enable a computer to provide compartmented, collaborative, integrated, automated analytics to analysts by causing the computer to execute computer-controlled operations comprising: selecting a computer-encoded project-specific workflow; determining a computer-encoded compartment manager, said computer-encoded compartment manager including computer-encoded information about the context of said project-specific workflow; retrieving said computer-encoded information about the context; selecting a computer-implemented automated analytic using said computer-encoded project-specific workflow; providing under control of said computer-encoded compartment manager said information about the context to said automated analytic; processing said computer-encoded information using said computer-implemented automated analytic, to generate thereby analytical information representing an outcome to said analysts; and processing said analytical information in accordance with said computer-encoded compartment manager and said computer-encoded project-specific workflow.

In a more specific embodiment, the project-specific workflow includes at least one project-specific attribute selected from the group consisting of: guidance to the automated analytics, as to the process to be followed, information to use as inputs, information required for outputs, and any required labeling, tagging, and compartmentalization. In a still more specific embodiment, guidance to the automated analytics further includes guidance for analysts.

In still another embodiment, the project-specific workflow defines rules based upon one or more aspects of the context. In a more specific embodiment, the project-specific workflow defines rules for each analyst, each project, for each installation of the system, or by the system design.

In another embodiment, the computer-encoded context manager executes under computer control at least one function selected from the group consisting of: generating or assigning tags associated with specific information elements, or with specific types of information elements within a compartment; generating or assigning compartments associated with specific information elements, or with specific types of information elements within a compartment; managing requests to, and information elements provided by, a data store to enforce rules for information access, tagging, and association rules; assigning or associating information elements or types of information elements with specific tags, associations, controls, contexts, or compartments; assigning or associating rules with information elements or types of information elements that require specific tagging or restrictions to be applied to newly created information elements and restricting the availability of information elements or types of information elements to which a requestor is not authorized access or use.

In still another embodiment, the computer-encoded context manager executes under computer control at least one function selected from the group consisting of: implementing access controls over information elements; implementing controls over tagging and association among multiple information elements; and enforcing information segregation of information elements, including logical and physical segregation of information elements among different data stores.

Yet another embodiment further comprising providing a set of rules defining the scope of visibility of information, the rules being effective to define private information, restricted information, and unrestricted information.

The foregoing and still more aspects and advantages of the present invention will be made clear when the text herein is read in conjunction with the accompanying drawings.

5 BRIEF DESCRIPTION OF THE DRAWINGS

FIG. 10 is an exemplary Indicators Validator worksheet and ratings tables.

6 DESCRIPTION OF SOME EMBODIMENTS OF THE INVENTION

Figure 1:
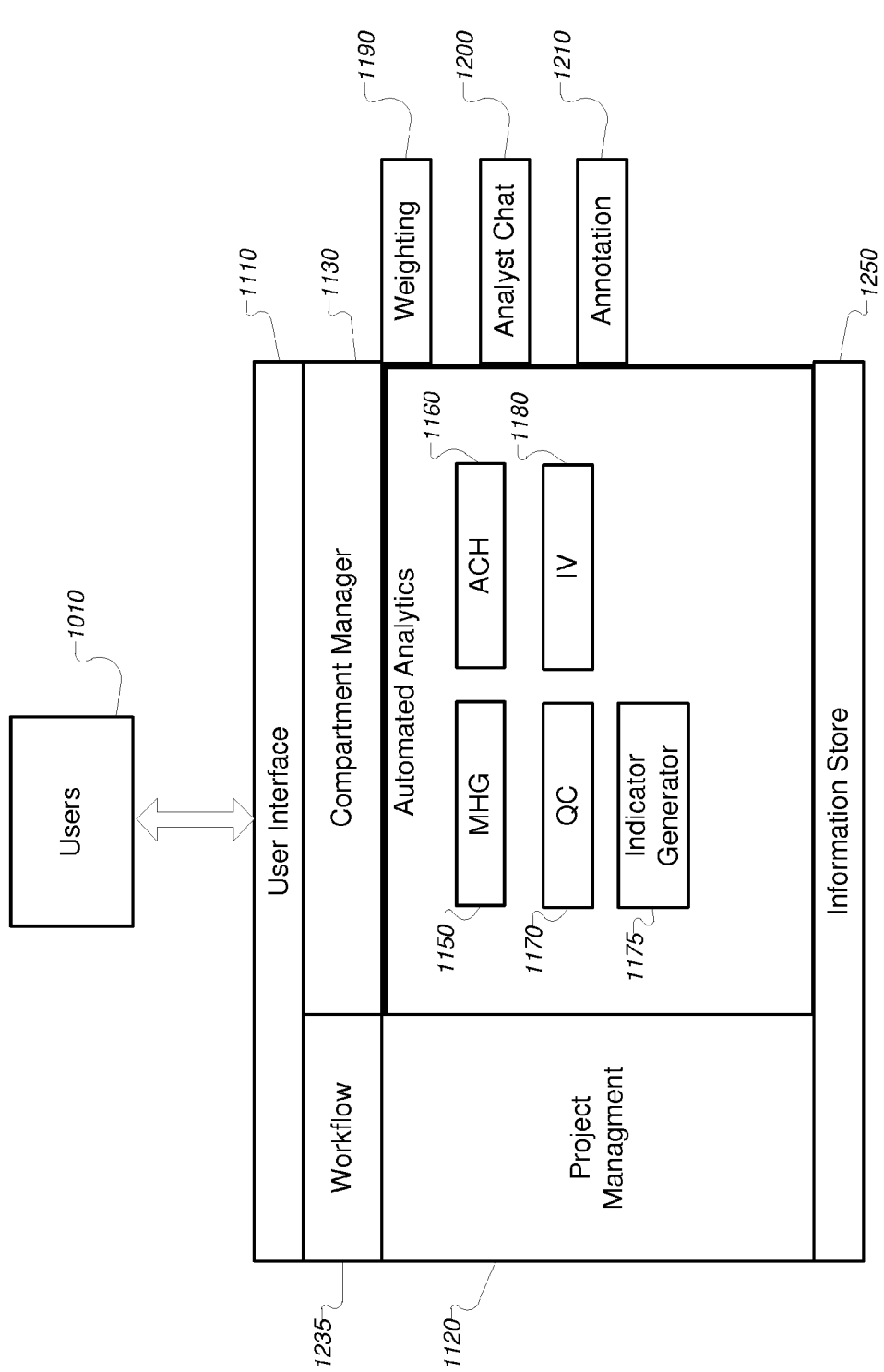
FIG. 1 is a diagram illustrating the components and the interaction relationships between various components and automated analytics of an exemplary automated structured analysis system in accordance with one embodiment of the present invention.

Exemplary embodiments of the current invention described herein are intended to illustrate important concepts of the current invention, and to aid those skilled in the art in practicing the invention. They are not to be considered limiting in any manner on alternative embodiments that are not so described.

6.1 Overview

Exemplary embodiments of the present invention implement systems and methods of making available automated and/or automation-assisted structured analytic techniques on behalf of, or in collaboration with, optionally distributed sets of users, who are referred to herein as "analysts". There may be many sets of analysts; each of the sets of analysts may overlap or be disjoint with every other set. Analytic activities supported by the present invention many include automated versions of manual analytic techniques, automated and/or automation-assisted association of relevant information with hypotheses and indicators, automated and/or automation-assisted rating, ranking, and/or scoring of hypothesis, indicators, and/or relevant information. Software components that implement one or more aspects of an analytic activity are called automated analytics. An automated analytic may completely automate all of the aspects of an analytic technique, automate portions of an analytic technique, or may provide automated assistance to analysts in the performance of one or more aspects of the analytic technique, such as retrieving and organizing information for the analyst; presenting information to the analyst in defined ways; soliciting, storing, and associating analyst-defined rankings, ratings, associations, and/or comments; or taking other actions such as performing and/or recording communications between analysts and/or members of a set of analysts.

Some exemplary embodiments of the current invention may be implemented as a single automated analytic, as a plurality of automated analytics, and/or in implementations where a combination of features are combined into a plurality of automated analytics which may share common components. In some exemplary embodiments, common components can be implemented as independent automated analytics, such as an information management automated analytic, a discussion automated analytic, a filtering automated analytic, etc. as is deemed proper by those skilled in the art. For purposes of description herein, a logical view will be used, where at least some features of the invention will be described as a single monolithic automated analytic, regardless of how they might actually be embodied in a specific exemplary embodiment.

In particular, aspects of the invention permit sets of analysts, possibly located in different locations or upon different computer systems, to work from a common information base to collaborate and implement structured analysis techniques while logically and/or physically separated, while reducing individual analysts' physical and cognitive workload, and providing calculation, management, and information compartmentalization of individual and aggregated analyst work products within the context of an analytical project or investigation.

Exemplary embodiments of the current invention provide project-configurable structured automated analytics for generating, testing, and ranking hypothesis and indicators, recording the results from these automated analytics along with associations with relevant information, sharing these items and relevant information, and supporting and recording collaboration between analysts.

Aspects of the present invention further extend analytic activities by supporting exchange of information elements between automated analytics in order to eliminate the need for re-entry of information when moving from one automated analytic to another, and so that associated information, such as analyst discussions, assumptions, and other related information elements and their associations are retained. By providing an automated means to move information elements between automated analytics, analyst workload is reduced, the opportunity for errors is reduced, and compartmentalization of information can be maintained.

Exemplary embodiments also comprise automated analytics and rules that implement and/or define one or more of the following: filtering of hypotheses; filtering of relevant information; providing analyst discussion sessions and associating the results of these sessions with specific hypotheses, indicators, or other relevant information; capturing analyst assumptions, ratings, and other information provided by analysts, where the outputs of the automated analytics are provided with additional rules in order to define and/or enforce compartmentalization of the resulting information; or where the information provided to/from an automated analytic is filtered, annotated, or changed in some manner. Examples of these limitations on the resulting information may include adjustments to previously entered analyst inputs or the information that is displayed to the current analyst based upon specialized knowledge of individual analysts, the defined level of visibility of an individual analyst, or the sensitivity of the input information.

In more particular aspects, the systems provided by the invention are computer-implemented systems for providing compartmented, collaborative, integrated, automated analytics to analysts. Such embodiments can be implemented using computers, wherein computer-readable medium containing computer-readable program control devices thereon, said computer-readable program control devices being configured to enable a computer to provide compartmented, collaborative, integrated, automated analytics to analysts by causing said computer to execute computer-controlled operations corresponding to the operations described herein. The construction operation of such systems and computer-readable program media will be familiar to those having ordinary skill in the art.

6.2 Exemplary System Architecture

FIG. 1 illustrates a logical diagram of an exemplary embodiment. Exemplary embodiments of the current invention are implemented using standard commercially available computer and network systems (collectively, computing devices), allowing use and access from diverse locations and at diverse times. For clarity, the system is presented as operating on a single, local computer without limiting the use of distributed components and/or distributed computing devices. The current invention provides for both local and remote operation of each component, each connected using well known methods of connections such as computer networks, message queues, and/or telephony. The specific connection method used is implementation dependent.

Analysts and Users (1010) interact with the system using the User Interface component (1110). The User Interface (UI) component (1110) comprises thick- or thin client interfaces to present aspects of the invention to the users. The UI manages the user interaction, and provide mechanisms for the user to authenticate and select one or more projects that they will operate under. Once such authorization has been accomplished, the UI provides the means for interacting with various components. Specifically, the UI provides analysts interface with the various automated analytics (1150, 1160, 1170, 1175, and 1180) and common components on an as-required basis. Specifically, the exemplary embodiment supports user interface access from a variety of computing devices, including a standard web browser (e.g. Internet Explorer), a terminal device (e.g. QTERM-G75 from QSI Corporation (Salt Lake City, Utah), a thin client (e.g. X-Windows Server, MS Remote Desktop), or a dedicated "thick" client running on a workstation, PC, or other general purpose computing device, or on a dedicated hardware or software platform. These will be well understood by those having ordinary skill in the art.

The Project Management component (1120) is configured to define projects, including configuring rules for projects, defining sets of analysts and their roles in the project, workflows, rules, compartments, project status information, required related information, tags, and associations, and other actions required to create, configure, and maintain a project. The Project Management component (1120) records project settings in the Information Store (1250), from which they are made available to the system, including being made available for use in workflows and by automated analytics.

The workflow manager (1235) implements project-specific workflows in conjunction with the compartment manager (1130) to make information available and to provide and enforce the project information context to automated analytics.

The automated analytics (1150, 1160, 1170, 1175, and 1180) provide for management of analytic processes, including specifications, information management, analyst interactions, and the mechanics of the specific analytic techniques. Automated analytics may make use of various common components, such as the exemplary common components (described below) of Weighting (1190), Analyst Discussion (1200), and Annotation (1210). In various exemplary embodiments, automated analytics may be embodied as separate threads, processes or programs. In other exemplary embodiments, they may be combined into a single thread, process, or program. In still other exemplary embodiments, multiple copies of an automated analytic may be used. Automated analytics' access to information elements in the information store is mediated by the compartment manager component (1130), which can limit or allow the automated analytics to access information elements.

User (1010) interaction with automated analytics (1150, 1160, 1170, 1175, and 1180) is mediated by the Compartment Manager component (1130), which can limit or allow an automated analytic to use or display various information elements depending on various combinations of: the user (1010), the information element, how the information element is tagged (or not tagged), the user's role(s), the user's group membership(s), the project's compartment specifications, the project rules, and other factors as described herein. All of the common components' (1190, 1200, & 1210) information access and display are similarly mediated by the compartment manager.

6.2.1 Compartment Manager

The compartment manager (1130) mediates access to and use of information elements by the automated analytics in accordance with a compartment specification. Compartmentalization includes the steps of identifying and/or selecting information, identifying and/or selecting the appropriate controls (e.g. access, tag-based, filtering, visibility) to apply to the selected information, restricting access and use of that information in accordance with the selected controls, applying the controls to processing activities as appropriate, and applying the controls to information generated by the processing activities. In addition, the compartment manager mediates subsequent access and use of information elements previously managed as part of a compartment. A compartment specification is a specification that defines one or more aspects of the controls required to implement compartmentalization. The compartment manager may be implemented as a stand-alone component and/or fully or partially integrated as part of one or more automated analytics. The compartment manager has a number of functions, including:

Implementing access controls over information elements.

Implementing controls over tagging and association of information elements with other information elements.

Enforcing information segregation of information elements, including logical and physical segregation of information elements to different information stores.

Application of information segregation includes operations not only for segregation of information elements, but determining when information elements and derived information elements are made available to automated analytics and/or may be displayed to analysts. For example, an analyst may be permitted to see only "raw" information elements, but not see the results of other analysts' work (e.g. they may not see the derived information elements). Alternatively, an analyst may be permitted to only see the results of other analysts' work, but not the underlying information elements. For example, an automated analytic that may use a first set of information elements to calculate a conclusion represented as a second set of information element(s), with supporting information element(s) associated to this second set of information element(s) as defined by rules controlling the first information element, where only the resulting conclusion is subsequently made available for viewing by an analyst. These operations may be implemented by combinations of Role-Based Access Control (RBAC), filtering, and other techniques for controlling use and/or availability of information elements.

The ability to control the creation and use of derived information is a particularly challenging problem solved by the compartment manager. In these cases, automated analytics that use specific information elements may:

Have access to the specific information elements restricted, where the elements are not made available to the automated analytic, Have access to the specific information elements granted, with the requirement that any resulting information be controlled or assigned to a specific compartment, or be tagged in a particular manner, Have access to the specific information elements granted, where subsequent use and/or display of the specific information elements by an automated analytic are restricted.

For example, a set of information elements is provided to an automated analytic for use in a calculation, with the restriction that the underlying information elements may not be displayed or otherwise identified to the user, whilst information elements created as part of the calculation are to be assigned compartment controls that permit their display and identification to analysts.

The compartment manager component performs the following functions in the system:

Creates, assigns, or removes tags that are associated with specific information elements, or with specific types of information elements, within a compartment, Creates or assigns compartments that are associated with specific information elements, or with specific types of information elements within a compartment, Manages requests to, and information elements provided by, an information store in order to ensure that specified information access, tagging, and association rules are complied with, Assigns or associates information elements and/or types of information elements with specific tags, associations, controls, projects, or compartments, Assigns or associates rules with information elements and/or types of information elements that require specific tagging and/or restrictions to be applied to newly created information elements, Restricts the availability of information elements and/or types of information elements to which the requestor is not authorized access or use.

6.2.2 Information Store

Storage for information elements, or any other data used by exemplary embodiments of the system of the invention, can be implemented using any storage method or methods known at the time of implementation or instantiation of elements of the exemplary embodiment, including, for example, magnetic disk drives, flash memory devices, optical storage devices, database management systems (DBMSs), network attached storage (NAS) devices.

In some exemplary embodiments, data can be stored on a plurality of storage devices. Each storage device can be used to store all or a subset of the data. Such storage can involve duplicating some or all data and storing a plurality of copies of the data on one or more storage devices. Duplication of data or choice of storage device can be for reasons of minimizing access delay, maintaining functionality when network communication is impaired or non-existent, to assist with maintenance of information compartmentalization, or for any other purpose determined to be proper by those with skill in the art.

Figure 2:
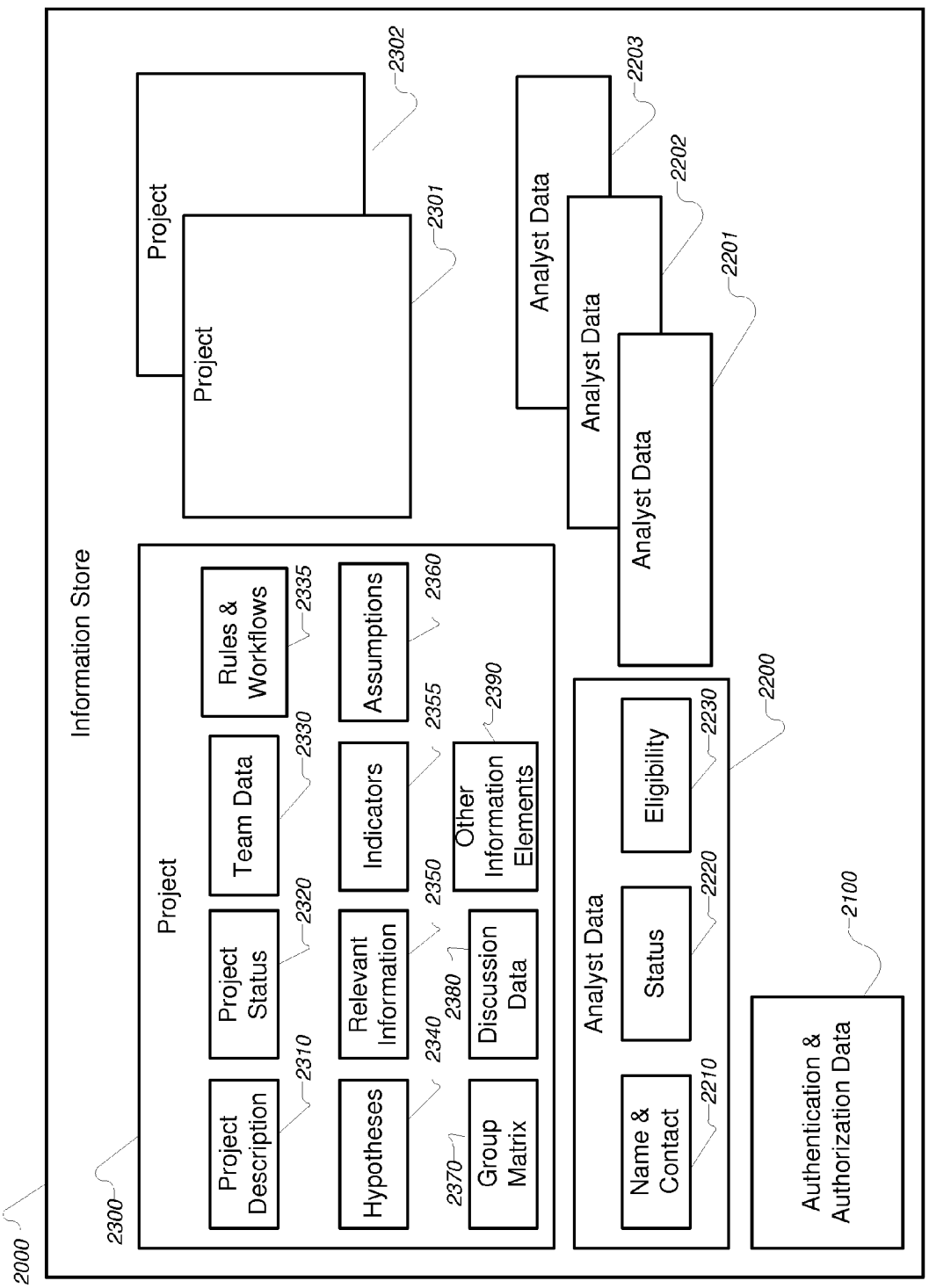
FIG. 2 is a diagram showing some of the information element types and structure of an exemplary automated structured analysis system's Information Store component, in accordance with one embodiment of the present invention.

In some exemplary embodiments, regardless of where data is stored, any computing device can locally cache any data to which it has access, using any caching method deemed proper by those having skill in the art. FIG. 2 is a diagram representing information elements required by at least some exemplary embodiments, and the organization of such elements for at least some exemplary embodiments. The illustrated information elements and organization are not limiting on other possible information element requirements or arrangements.

An information store (2000) comprises authentication and authorization data (2100) that is used to determine whether a given analyst should be permitted access to the system, and what types of access or connections are allowed. This data can comprise user or account names, passwords, multi-factor authentication data, privilege and information access attributes, location information, system-wide group and rule information, or other information as required and understood by those having skill in the art. In some exemplary embodiments, authentication and authorization data (2100) can be stored, used, and/or maintained in part or in whole by the operating system of the hosting device, or by third party systems. In other exemplary embodiments, authentication and authorization data (2100) can be stored, used, and/or maintained in part or in whole by the exemplary embodiment of the invention.

Information elements may be stored in an information store. Information elements comprise:

a hypothesis or set of hypotheses, an indicator or set of indicators. Indicators are information elements representing observable, or potentially observable, actions, thresholds, conditions, or events that can be automatically monitored to collect relevant information over time. Indicators can be assembled into indicator sets. Indicator sets are useful, for example, for defining a plurality of indicators whose simultaneous or closely timed occurrence or reaching of predetermined values would suggest that one or more hypotheses about events have occurred, are occurring or are very likely to occur.

an assumption or a set of assumptions, an item of relevant information or set of items of relevant information, a discussion element, or set of discussion elements. Discussion elements comprise information elements typically collected from the Analyst Discussion component which may include: entered text, audio recordings, computer transcribed audio, captured e-mails, copies of content, messages, comments made in discussions between team members and related metadata, such as the date and time the comments were made, information identifying the analyst that made them, and the context in which they were made (e.g. the project as a whole, concerning a particular hypothesis, item of relevant information, indicator, assumption, etc.), or other forms of information elements as are determined to be useful by those with skill in the art.

evaluations and assessments, including, for example consistency evaluations, validity evaluations, relevance assessments, or credibility assessments, information element association information, such as the association between an indicator and a hypothesis or between an assumption and a hypothesis, tags.

The information store (2000) further comprises one or more analyst data records (2200, 2201, 2202, 2203), each of which holds information related to a single analyst. Such information can comprise name and contact data (2210), status information (2220) such as the projects the analyst is a member of, experience level, special areas of expertise, etc., and eligibility information (2230), such as whether the analyst is permitted to be a project lead, security clearance levels, etc.

The information store (2000) also comprises one or more project information records (2300, 2301, & 2302), each of which holds information related to a single project. Such information can comprise descriptive information about the project (2310), project status information (2320), team data (2330), compartment specifications, rules and workflows (2335), and information elements, including, by example, hypotheses (2340), relevant information (2350), indicators (2355), assumptions (2360), and other information elements (2390) entered by analysts, current group matrix information (2370), or discussion data (2380) Additional information, such as message and email queues (not shown) may be integrated into the information store as needs dictate.

Project description information (2310) records hold information such as a project name or ID, an inception date, text describing the issue or issues being investigated, key information sources, etc. Project description information (2310) is entered by the project owner, who is generally the project team lead, or a person the project team lead has delegated this task to. Project description information is typically static once entered, but can be modified by the project team lead, or team member assigned to do so, when necessary. Authorization to enter or edit project description information (2310) is specified in exemplary embodiments by role or by other rule-based specification.

Project status information (2320) records hold information about the current state of the project as a whole, such as whether the project is still being set up, is active, or has been closed. These records can also contain additional information the nature of which can depend on the project state, such as final conclusions reached for a closed project.

Team data (2330) comprises information about team members; current, past or anticipated future. This information can refer to analyst data records (2200-2203) for each analyst on the team, or comprise additional information, such as the analysts' roles on the project, the start date of the analysts' participation, end date of the analysts' participation, links to other records related to the analyst (e.g. electronic discussion records, assumptions, suggested hypotheses or indicators, etc.).

Compartment specifications, rules and workflows (2335) comprise information used to define and enforce compartments, project-specific rules, and to define project-specific workflows. This information can be defined as a system-wide template and manually or automatically copied into each project to be used as-is or as a starting point for project-specific modifications in some exemplary embodiments. In other exemplary embodiments, compartment specifications, rules, and workflows are defined individually for each project.

Hypothesis records (2340) identify and describe hypotheses that the project is currently using, proposed additional hypotheses that have not yet been accepted for the project, and invalidated hypotheses kept for reference purposes. Additional information, such as the date a hypothesis was entered, it's current acceptance or validity status, the identity of the analyst who suggested or entered it, links to related relevant information or indicators, etc. can also be included in at least some exemplary embodiments.

Relevant information records (2350) contain information describing relevant information that is useful for evaluation of hypotheses. They also include optional associated reason, justification, explanation, and/or ranking information. Relevant information comprises combinations of content, URL links to sources, date of acquisition, the type of the relevant information (factual, deduced, hearsay, etc.), analyst estimates of the reliability of the relevant information, the source of the relevant information, or other related information as deemed useful by those with skill in the art. Relevant information record content further comprises physical evidence, documents, the information gained from analysis of physical evidence, witness reports, photographs, videos, audio recordings, transcripts of visual or audio recordings, expert testimony, deductions based on other relevant information, computer data, or any other information that can be used to support one or more hypotheses, to show lack of support for one or more hypotheses, or to suggest one or more possible hypotheses. Relevant information records may also comprise computed or calculated values or results sets, such as those determined to be relevant to a hypothesis by an automated analytic or other automated process. The computed or calculated values may be part of the content identified by the relevant information record or may be part of the information providing reason, justification, explanation, and/or ranking information.

Indicator data records (2355) contain information describing indicators. Indicator data records can comprise text, URL links to sources of relevant information, pointers to database entries, date of entry, query or other specifications for computation to perform to assess the indicator, frequency of monitoring, date of last check, analyst estimates of the priority of the indicator for assigning monitoring resources, the identity of the analyst or group that suggested the indicator, or other related information as deemed useful by those with skill in the art.

Assumption records (2360) contain information about assumptions entered by team members. Such information can comprise text descriptions; links to relevant information, indicators, or hypothesis records that the assumption concerns; links to the analyst record of the team member that entered the assumption; links to Discussion Data records (2380); estimates of the validity of the assumption entered by various team members; or any other information deemed useful by those with skill in the art.

The group matrix information (2370) comprises the calculation results, references to information elements, and other information elements that comprise the displayed information in cells of the group matrix presentation. The group matrix can, in some alternative embodiments, be calculated as needed, rather than stored in the Information Store (2000).

Discussion Data (2380) comprises information elements or references to information elements created by the analyst discussion common component. They represent analyst thinking about the particular subject over time, as well as capture reasoning behind the ratings assigned by the team members or other decisions made by an automated analytic.

Other information elements (2390) comprise additional information elements, such as tagging information, evaluations and assessments, or information element associations.

In some exemplary embodiments, each information element is encoded with compartment specific information at the time of its addition to the system.

Information elements are categorized into classes. The classes are implementation specific and are defined as part of the compartment rules. Three useful information element classes are base information elements, derived information elements, and independent information elements. Base information elements are those information elements that are input by analysts. Derived information elements are those information elements that are created by or derived from other information elements. Independent information elements are those that are created by an automated analytic without reliance upon underlying information elements.

In some exemplary embodiments, information in the information store (2000) is encrypted and is decrypted only for access as the information is made available to the automated analytic. Encryption and decryption decisions are made at the time the information elements are made available to an automated analytic.

6.3 System Elements

In a one aspect, the invention provides a system configured to assist one or more analysts working on a project (collectively referred to herein as a "team") in breaking a complex analytical problem down into its component parts, or at least parts having a lesser degree of complexity in comparison to the problem viewed in its entirety: a set of hypotheses, preferably a set containing a correct hypothesis, relevant information and other information elements that are useful in assessing the set of hypotheses; indicators and other elements that assist in acquiring additional relevant information; and facilities for recording analyst assessments regarding the consistency and/or inconsistency of each item of relevant information with respect to each hypothesis, or the diagnosticity of each indicator for each hypothesis, and providing mechanisms for storing this information. The system of the invention guides one or more analysts (individually, collectively, or in defined groups) through automated or semi-automated processes that help them pursue their analysis, collect additional relevant information, and/or question their assumptions and gain a better understanding of the subject of the analysis, while integrating each analyst's work product within the system in order to provide a unified view of these work products for all analysts or across one or more defined groups of analysts, while permitting review or monitoring of the analytical process so that the quality of the resulting conclusions can be assessed. In one embodiment, the system provided by the invention is configured to assist analysts with automated or semi-automated generation of hypotheses using techniques designed to reduce bias, to test hypotheses, and to identify and evaluate the utility of indicators. In a more particular embodiment, the invention provides automated and semi-automated processes to:

Compartmentalize information elements.

Effectively visualize one or more information elements from alternative perspectives, Extend investigations to find and consider additional relevant information or indicators that were not initially considered or known, Identify, record, and question assumptions, Identify and document dependencies between hypotheses, relevant information, indicators, arguments, assumptions, and comments, Filter and sort information based upon current perceived relevance, defined filter rules, roles, or group associations, for display or use in computations, Avoid sources of bias in the generation of hypotheses, the rating of relevant information consistency with hypotheses, as well as in determination of indicators and rating their diagnosticity.

6.3.1 Rules

Other embodiments of the invention also provide for the use of rules to limit or expand permitted analyst uses of the system, to define how information elements are displayed or used in computations, to specify requirements, behaviors, default values, and other aspects of functionality of the system in a manner that permits adjustment of functionality to meet specific requirements of each embodiment, installation, and/or project.

Rules can be useful in supporting compartmentalization, filtering, and role- or group-based definitions. Rules can specify sets of analysts as individuals, by role, by group, or by combinations of any of these as well as defining those excluded from any of the sets. For example, a rule can specify applicability to analysts that are members of GroupA, but not members of GroupB, and who have the role of Team Member or alternatively who have the role of Project Owner and who are not Bob or Jane.

Rules can specify functional aspects of automated analytics and/or operations of the system, such as "display information element", "survey", "compute value", or "weight input", as well as specifying information elements or operations that the specifications apply to, such as "Hypothesis 1", "items tagged Confidential", or "compute diagnosticity".

Rules can be used to specify actions (e.g. "add", "delete", "view", "edit", "rate"), as applied to information elements (e.g. "add hypothesis", "view relevant information", "rate indicator", etc.), with restrictions based on group membership (e.g. "add hypothesis if in owner group"). Rules can also specify restrictions based on tags (e.g. "view relevant information if tagged 'view-by-all'). Rules can also specify combinations and alternatives, such as "add hypothesis, relevant information, or indicator if in owner group or in admin group", or "view relevant information if in GroupA and information tagged 'view-by-GroupA' or 'view-by-all'".

Implementation of rules can be by a variety of techniques well understood by those with skill in the art, such as by use of built-in software functionality, dynamically loaded software modules (e.g. DLLs or "plug-ins"), interpreted rules defined by internal mechanisms, or loaded from external sources, such as XML definitions, JSON specifications, or name/value pair sets. Any combination of these techniques can also be used. The specific syntax used to specify rules is implementation dependent, and will be well understood by those with skill in the art. Some particularly useful types of rules include:

Filtering rules may include aspects such as time of occurrence of a relevant information event, time of collection of an item of relevant information, role, group or analyst identity that submitted a hypothesis, item of relevant information, or other input, experience level, group, role or identity of the analyst that entered a hypothesis, item of relevant information, or other input, the source of relevant information, or other factors as deemed useful by those with skill in the art. In some exemplary embodiments, filtering rules can include or suppress any information elements available to the analyst whose compartment is in force, based on any attribute of those information elements as specified by one or more rules.

Aggregation rules define sets of information elements (and associated information elements) to be aggregated, and optionally define an aggregation method for aggregating these defined information elements. Aggregation rules optionally specify creation of one or more information elements. For example, an aggregation method is a query, a calculation, or other process step defined within an automated analytic that produces a value or values from the set of information elements. Aggregation rules may further specify that aggregated information elements be created that represents the result of performing an aggregation rule-specified method, or that specific associations between information elements be made.

Compartment specifications comprise a collection of rules and specifications, further comprising one or more of ACLs, RBAC information, information element definitions and specifications, filtering rules, information movement rules, access rules, information storage rules, and other rules that affect making information elements available within the system. An example visibility scope rule is an example of the types of rules defined as part of the compartment rules. One example rule defines three types of information element, analyst-private, restricted-public, or public. Analyst-private information elements are those information elements that are visible only to the analyst who entered them; these may be used to record working thoughts and assumptions without sharing them with other members of the team. Restricted-public information elements are those information elements that are made available to at least one other analyst on the team, but are not made generally available as public information. Public information elements include those information elements which have been made available for sharing to the whole project team. In some exemplary embodiments, analyst-private or restricted-public information elements may require additional publishing and/or approval steps to make them visible to other team members. Similarly, an information storage rule that is part of a compartment specification might require all information elements of a specific type (e.g. analyst-private) be stored in a particular information store, or might require that all information elements created by a specific automated analytic processing information for a specific compartment be tagged with a compartment- or automated analytic-specific tag. In other exemplary embodiments, a compartment rule might specify that identified (e.g. analyst-private or information elements associated with the "eyes-only" tag) information elements not be shared with other analysts, while still permitting the use of and association with those information elements in calculations performed by automated analytics.

Weighting rules provide definitions for weighting specific analyst or group of analyst results. They can be based on analyst identity, group memberships, analyst roles, other analyst and/or group attributes (such as length of service or whether the analyst or group is identified as a subject matter expert), or a combination of these.

6.3.2 Common Features

Exemplary embodiments comprise features that are common to a plurality of automated analytics. Common features can be presented differently in each automated analytic while the feature itself remains common to a plurality of automated analytics. For example, an analyst discussion in an ACH automated analytic can be associated with individual hypotheses, relevant information, or to the group matrix cells where analysts rate the relevant information with respect to the hypotheses. Analyst discussions in an IV automated analytic can be associated with individual indicators, or hypotheses, or to the cells in the group IV matrix where analysts rate the relevance of indicators to hypotheses. Analyst discussion in a QC automated analytic can be associated with individual 2×2 matrices, individual quadrants of each generated 2×2 matrix, to individual contrary assumptions, or to each of the resulting hypotheses. Despite the differences in association in each automated analytic, in each case, the discussion component facilitates the presentation of hypothesis, indicators, and relevant information to two or more analysts, and captures discussion results (and possible the discussion details themselves) that are subsequently associated with the presented hypothesis, indicators, and relevant information in a manner that records the interaction for future review. Variations in presentation (e.g. a pop-up dialog box, a new window on a screen, or an area on the automated analytic display dedicated to discussion about a set of currently presented objects, etc.) can be incorporated without changing the basic nature of the feature, or its utility. Common features are used in one way or another in each of the structured analysis automated analytics of exemplary embodiments (MHG, QC, ACH and IV).

Exemplary common features are listed, and then described more fully below. Descriptions of exemplary uses in each automated analytic are described in the automated analytic description below. Exemplary common features comprise:

Project Management
Compartmentalization
Group Support
Collaborative activities
Filtering
Analyst Discussion
Annotation
Tagging
Audit Logging 6.3.2.1 Project Management In some embodiments, project management supports viewing, editing and adding project-related information, such as the project description, project status, compartment specifications, and team data, to the information store for a project. This feature is typically not authorized for use by all analysts, but is restricted to those with appropriate roles.

6.3.2.2 Compartmentalization

For reasons of security, information spread limitation, reduction of group-think, or other purposes, restriction of access to at least some information and/or some or all results derived from such information to a subset of analysts working on an analytic project can be beneficial. Such restriction is referred to herein as "compartmentalization". Compartmentalization of information is useful for a plurality of reasons, for example maintenance of security, confidentiality of information, evaluation of analysts, or for study of bias effects. Compartmentalization of information and processes is especially important when working with business and intelligence information, and comprises a novel aspect of the system.

Aspects of the invention provide mechanisms to support compartmentalization of information. In some embodiments, the present invention provides for flexible restrictions on access to information elements. Restricted, or "compartmentalized", information elements are only accessible by analysts and/or automated analytics specified by the compartment specification. Compartmentalization of information elements is supported in a number of ways in exemplary embodiments.

By permitting analysts to work separately, "groupthink" is reduced or eliminated, and by sharing information through the system, the benefits of collaboration are preserved, while the mechanics of distributing current ideas and coordinating work flow are taken care of without analyst effort, thus reducing the complexity and opportunity for error.

It is not possible to simply combine known techniques for compartmentalization with system designs for collaboration and information because of the complexity required to integrate compartmentalization rules and controls with the new streams of information generated by collaborative techniques, and to then selectively enforce the compartmentalization of information whilst maintaining the collaborative environment across a plurality of information. By enabling compartmentalization as described herein, exemplary embodiments can reduce or eliminate the undesirable spread of specific information, without the need to exclude such information from the analysis, or some analysts from participation, either of which can limit the effectiveness of the analysis.

Figure 3:
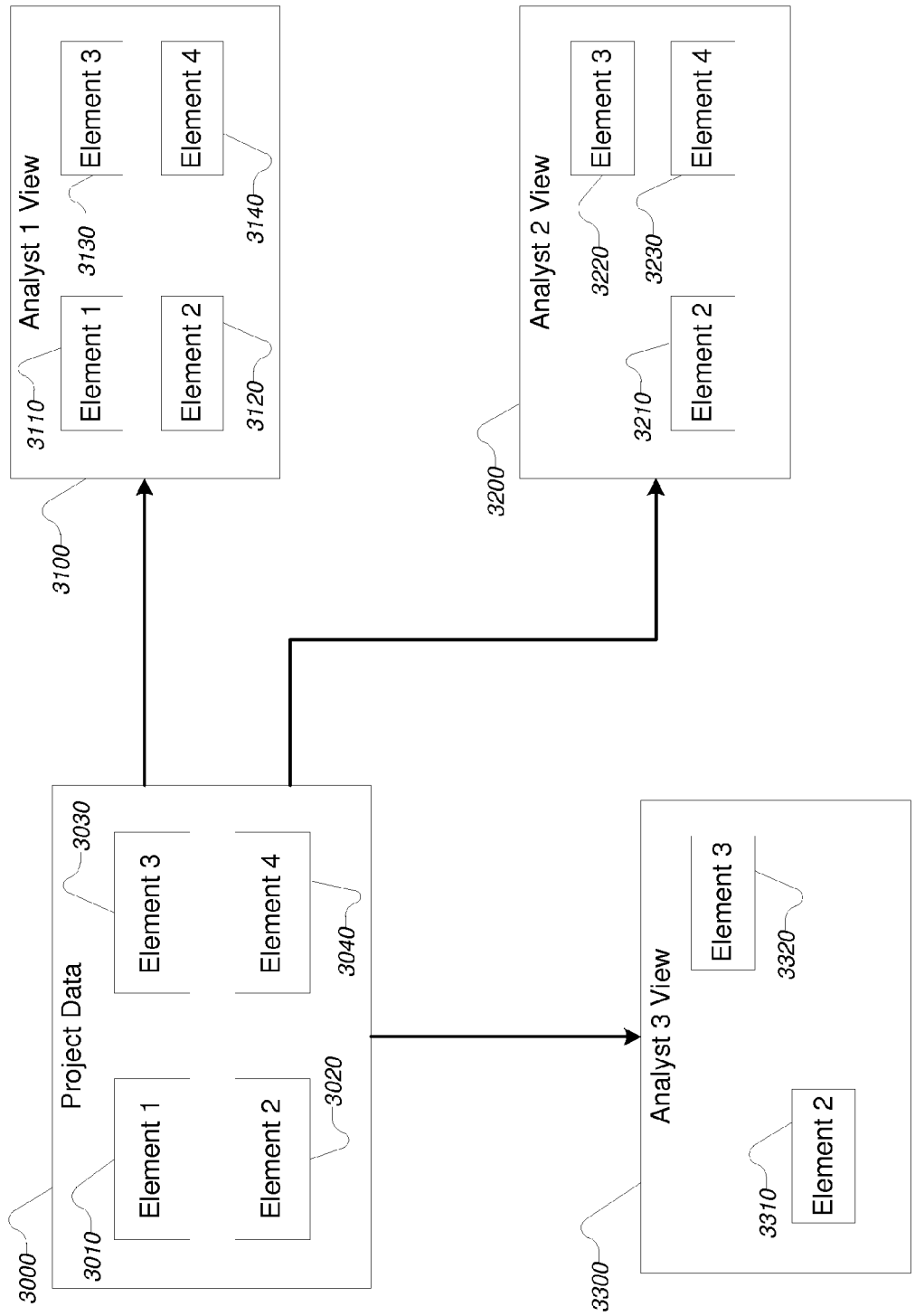
FIG. 3 is a diagram showing how project information elements can be filtered for viewing by analysts, in accordance with one embodiment of the present invention.

Compartmentalization is supported in a first example where each project within the system of the invention associates all information elements with information viewing and use restrictions that prohibits access from unauthorized use within the system. Compartmentalization is supported in a second example embodiment where mechanisms to restrict access to, and or viewing of, specified information elements to specific roles, or analysts are provided. FIG. 3 is a diagram illustrating this. The project data (3000) shown comprises four information elements, Element 1 (3010), Element 2 (3020), Element 3 (3030), and Element 4 (3040). Three analysts are shown, Analyst 1 (3100), Analyst 2 (3200), and Analyst 3 (3300), each of whom has a different view of the project data. Analyst 1 (3100) has an unrestricted view that includes all project data (3110-3140). This is a view that would be typical of a project owner. Analyst 2 (3200) has a view that does not include Element 1 (3010), but which does include the other three elements from the project (3210, 3220 & 3230). Analyst 3 (3300) also has a view that does not include all elements of the project, but Analyst 3's view (3300) is more limited than Analyst 2's view (3200), being limited to Elements 2 (3310) and 3 (3320). The views shown could result from role-based compartmentalization, rule-based compartmentalization, or from a combination of both. Compartmentalization is extended in the present invention to encompass the permitted uses of information elements within automated analytics, and to actions required upon information elements created within those automated analytics. Permitted uses may include specific actions (e.g. associate with, view, use in calculations) or sets of actions (e.g. opaque use means use in calculations, form associations with, but not permit viewing by an analyst).

In some more specific embodiments, the compartmentalization is logical, physical, or a combination of both techniques. Logical compartmentalization of information is useful when the system of the invention is hosted upon trusted computing platforms, such that the underlying operating system and application controls may not be subverted. Logical compartmentalization is enforced through software design, where the software is designed and implemented to enforce the compartmentalization. Physical compartmentalization is useful when the underlying computing platform is not trusted, or when the information is so sensitive that it is deemed important to be able to physically secure portions of the information. Physical compartmentalization is enforced by physically locating the compartmentalized information in such a way that it is not accessible to software or users outside of the compartment, and enforcing the reading and writing of specific information elements to the physically separate storage (e.g. a separate information store).

Physical compartmentalization of information can involve the use of a plurality of storage devices as described above. Determination of whether to duplicate data on a plurality of storage devices, and which device or devices to store particular data on, can be determined at least in part by system configuration settings or by rules defined for the system as a whole, or on a project by project basis. For example, one or more rules can be used to define that data tagged in a particular manner be stored only on storage devices attached to or controlled by a particular computing device. Rule-based control of data storage can cause data to be stored based, for example, on how data is tagged, the type of data (hypothesis, relevant information, indicator, annotation, audit log, etc.), the analyst who entered the data, the location or computing device where the data was entered, the time or date the data was entered, what groups have access to the data, or any other characteristic deemed relevant or useful by those having skill in the art.

6.3.2.3 Role-Based Access Control

In exemplary embodiments of the invention, the system of the invention provides mechanisms to support rules that define role-based access controls for information retrieval, access, viewing/display, and storing information aspects of the system.

Implementation of such role-based access control systems is well understood in the art; however, implementation of role-based access control for structured analysis, as provided by the present invention, is especially important as it is performed as part of the compartmentalization of information as defined above. One particular distinction is the use of a tri-part access control; where information access may be blocked, enabled for opaque use, and enabled for visible use. Each of these types of access is supported by the role-based access controls of the present invention.

In some embodiments, role-based access controls are integrated with all aspects of the system of the invention. In more specific embodiments, specific information elements are restricted for use and/or access by those in one or more roles. Related information elements, such as assumptions linked to a particular hypothesis or item of relevant information that is itself restricted, are automatically restricted as well.

Compartment rules can be defined that describe the definition of roles, their functional capabilities assigned to those roles, and the use of the role within the compartment. A table of exemplary roles is described below.

| Role | Example Functional Capabilities |
| --- | --- |
| Project Owner | Assign analysts to roles within the owned project, define analyst groups, assign analysts to groups, define rules for weighting analyst inputs by analyst, group, role, and/or information element or procedure, define rules for display or access to information elements. |
| Contributor - hypothesis | Add a new hypothesis to the suggested hypothesis list for approval by a "Reviewer - hypothesis" role holder. |
| Reviewer - hypothesis | Review and accept a suggested hypothesis into a project. |
| Contributor - relevant information | Add a new item of relevant information to the suggested relevant information list for approval by a "Reviewer - relevant information" role holder. |
| Contributor - indicator | Add a new indicator to the suggested list of indicators for approval by a "Reviewer - indicator" role holder. |
| Reviewer - relevant information | Review and accept a suggested item of relevant information into a project. |
| Reviewer - indicator | Review and accept a suggested indicator into a project. |
| Contributor - analysis | Add new analysis information elements (e.g. ratings in an ACH matrix) to a project. |

| Role | Example Functional Capabilities |
|---|---|
| Team Member | A person with "Contributor - hypothesis", "Contributor - relevant information" and/or Contributor-indicator", and "Contributor - analysis" roles. |

Role information is configured as needed for each instantiated system, and/or for each project. The roles assigned to individual analysts are specific to a particular project. A given analyst can be in the role of Team Member on a first project, in the role of Project Owner for a second project, and have no role in a third project.

6.3.2.4 Group-Based Capabilities

For purposes of defining compartmentalization boundaries for information sharing, weighting of analyst judgments, permitted analyst capabilities, filtering of information displayed or used in calculations, or for other purposes it can be useful to be able to specify subsets of analysts as a group, rather than name them individually, or force them into specific roles. Exemplary embodiments of the invention provide means to define groups, and to associate analysts with them. Analysts can be members of a single group, a plurality of groups simultaneously, over time, or both, or members of no groups. Group names can be used in rules or for other purposes, such as sending e-mail, to refer to all analysts who are members of the group.

In some exemplary embodiments, groups are defined relative to a specific project, and the same group name can be used in disparate projects without conflict. Membership in a group in a first project would not provide membership in a group having the same group name in a second project. In other exemplary embodiments, group membership is defined relative to the system rather than to individual projects, and group membership would be the same across all projects in such systems. For example, membership in a given group would confer membership in that group in a first project and in a second project. In yet other exemplary embodiments, project-specific group definitions and system-wide group definitions are both supported, and the scope of a group is defined when a group is created. In some such exemplary embodiments the same group name cannot be used for both system-wide and project-specific purposes, while in other such exemplary embodiments group names can be used for both system-wide and project-specific purposes, but only the project-specific defined group, will be used within the project that defines it.

6.3.2.5 Collaborative Activities

A number of common features support collaborative activities of the system.

Templates provide reusable and shared definitions for project-based specifications. For example, the guidance of the user through the characteristic determination process of the MHG automated analytic can be template-based, and vary from project to project. Templates may define one or more aspects of the project. Different analysts may be assigned to use the same template, or to use different templates. By using different templates for at least some analysts, unintentional bias resulting from similar questioning patterns is avoided. The decision of which template to use for which project, team, or analyst can be random, be rule-based, be role-based, or any combination of these.

A second common collaboration support aspect of the system is the handling of groups of analysts (or groups of analysts and automation that provide results in the same form as analysts). For example, when a set of answers to questions are input by the analysts in response to a process of an automated analytic, the analysts selected may only include those analysts that meet the requirements of specific compartment rules. In some cases, the answers input must be reviewed by one or more additional analysts before the answers are made available for use by others. As with other types of information elements, answers input can be automatically and/or manually tagged as specified.

When analysts do not work as a complete team to enter answers to questions or to enter alternatives, the system collects the individual sets of answers and alternatives to enable presentation of a collective list of answers and plausible alternatives for each definitional question. Information elements in the collective list can be filtered as required to maintain compartmentalization, based on the tags or other information elements associated to each information element. The sharing of questions and analyst inputs, and optionally, the review of the questions and inputs in a collaborative and filtered environment, materially improves the outcomes of automated analysis processes. The use of template-based definitional materials extends the flexibility of the analytical technique to a wide range of analytical spaces.

In the case of analysts working in subsets of the team, the system of the invention computes a team consensus from the various analyst or team subsets that enter answers. Computation of a consensus can involve weighting of inputs based upon weighting rules. Alternatively, analysts can work as a team in this process, reaching a single consensus by agreeable means and inputting the resulting answers using the user interface.

In exemplary embodiments, providing answers to questions can be divided and distributed across a project team, and/or may be distributed in time. Selection of analysts to assign work to can be done randomly, by role, by group memberships, or in combinations of these or other methods. In some exemplary embodiments, a given question can be assigned to a plurality of analysts or sets of analysts for evaluation of credibility. The various answers provided can be averaged, the lowest chosen, the highest chosen, or in some other manner a single answer determined for subsequent processing. Division of the work in this manner extends current manual systems by permitting collaboration and sharing of the workload, and permits decisions to be recorded for future review.

6.3.2.6 Filtering

In exemplary embodiments, rule-based control of information display, accesses, and processing enable controlled sharing of information elements. These limitations on the access and/or use of information elements are referred to herein as "filtering".

Aspects of the invention provide mechanisms for filtering the display of and/or use of information elements and computed results in various ways such that chosen subsets of available information or computation results are displayed, used in aggregations or otherwise treated in a first manner, while other information or computation results are treated in a second manner. Such filtering is useful in maintaining compartmentalization of information, to focus on particular aspects of an analytic project, to consider alternatives, evaluate analysts, and for study of bias effects. In some exemplary embodiments filtering is achieved through the use of rules in conjunction with roles, groups, and individual analyst identities, as well as tagging of information elements, to define how and when filtering is to occur.

Filtering is also used by the compartment manager to determine which information is made available to an automated analytic, and the terms under which it is made available. For example, the compartment manager may make the determination that a specific piece of information will not be made available to a specific analyst for the purpose of performing a specific analytic activity, but may make that same piece of information available to the analyst for a different analytic activity. Similarly, the compartment manager may make the information available to the automated analytic for use in calculations under the provision that it not be shown or displayed to the analyst.

By creating groups for subsets of analysts on a team who share an information "compartment", or who have similar expertise or domain-specific knowledge, and appropriately tagging information elements, rules can be defined to limit display or use of information elements to appropriate analysts or to enable weighting of judgments as needed. For example, analysts can be assigned to project groups such as "cleared-agency-staff", "consultant", or "allied-representative", and have their access to one or more information elements and/or processes (e.g. rating cells in an ACH matrix) restricted or enabled. Hypotheses that refer to agency-sensitive materials would be restricted by appropriate rule definitions to members of the "cleared-agency-staff" group, materials that are sensitive would be restricted to members of the "cleared-agency staff" or "authorized-consultants" groups, and other materials left unrestricted and available to those in any, or no, group. In another example, a consultant (e.g., a forensic expert in a police investigation) can have their access and input restricted to specific hypotheses and information elements within a particular project for which they are consulting. In yet another example, a police investigation into a crime that could possibly involve a member of the police force, whose identity is not yet known, can optionally restrict critical relevant information access to the project team lead and those members of the team who are known not to be involved in hopes that inadvertent revelation of knowledge of that information might help to identify the suspect, while allowing access to all other relevant information to the entire team. This last example points out that even knowledge of the groups assigned to analysts can require restriction.

The filtering supported by exemplary embodiments of the current invention enables team members to compare differences in analyst inputs or values computed from them on an aggregate basis for the entire team, for subsets of the project team (e.g. for various roles or groups of analysts), or for one-on-one comparisons between individual analysts. for the ability to view differences for any combination of pairings and groupings significantly increases the utility of the system for analysts and managers by permitting alternate views of the information to see how individual analysts compare to each other, or to the team as a whole, to determine whether there are different "camps" within the team that share similar opinions, or for other reasons. In exemplary embodiments, groups of analysts may be defined according to various criteria, such as experience, employing agency, nationality, or other factors or combinations of factors, such comparisons can involve comparisons between groups possessing such various characteristics.

The information elements available for filtering by a given analyst can be pre-limited by compartmentalization rules. In some embodiments, computation processes may be restricted to the information available in a particular compartment, while in other embodiments computation processes may involve information from other compartments, and compartmentalization only restricts viewing of the individual information elements used in the computation. In the later type of embodiment, analysts can compare their own or other information in compartments they have access to against computation results that include information elements from other compartments or the entire project, without having direct access to all of the information used in the computation. For example, an analyst can answer the question, "How does my evaluation of Hypothesis One compare to the team's?" without being able to know what ratings other individual team members have assigned to that hypothesis. This can assist with development of a team consensus or enable discussion of such consensus without undue bias based on member position, reputation, or other factors, and without revealing information restricted by compartmentalization outside of its compartment.

In some exemplary embodiments, when display of an information element is suppressed by filtering required to maintain compartmentalization, it can simply be omitted, or be replaced by an alternate display. The alternate display can, for example, indicate that display of the information element is being suppressed, and why. For example, "Hypothesis requires specific group membership for viewing", or "Item of relevant information viewable only by group X members". In some embodiments, an alternate description specific to the suppressed information element can be specified showing to those not possessing membership in a required group. For example, "hypothesis alpha", or "Terrorist group planning an attack", rather than the more specific hypothesis description that would be shown to someone in the required group, such as "Gray Friday terrorist group planning an attack against an embassy of the USA in Europe." In some embodiments a different alternate description can be provided for each group. In all cases, some indication that the information element is restricted is also present, such as an icon, color coding of the text or cell, etc.

6.3.2.7 Weighting

Aspects of the invention also provide mechanisms to support weighting of analyst judgments such that the opinions of some analysts count for more, or less, then those of other analysts in determining the results of an operation involving analyst judgment (e.g. when rating relevant information vs. hypotheses, or indicators vs. hypotheses). Weighting can be useful when a particular area of the analysis involves domain-specific knowledge and understanding that is possessed by a subset of the analysts on a team. Weighting can also be useful to give more credence to the opinions of analysts who are experienced with the techniques being used, and less credence to novices who may not understand exactly what is needed. Weighting definitions are provided in rules.

It is common to have a project team with members who possess a range of experience levels with structured analysis methods, and who have diverse subject matter expertise. Judgments about relevant information, indicators, or other aspects of an analysis can vary in usefulness based at least in part on these factors. For instance, if some relevant information concerns the activities of a terrorist organization in a particular country, a team member who has studied that particular terrorist organization extensively may have a different opinion about the relevant information than a team member who only has experience with diplomatic aspects of that country. It can be reasonable to weigh the terrorist group expert's opinions more strongly than team members without that expertise. To support such needs, exemplary embodiments of the current invention can use rules to specify adjustments to analyst inputs when using those inputs in calculations such that not all analyst inputs have the equal effects on the calculation results. Specification can be done using rules that define which analyst or analysts are involved, what adjustment is to be made, and which calculations the adjustment is to apply to.

Specification of which analysts' inputs to adjust can be by role, by group, by individual analyst identity, or by any combination of these. Rules, as described herein, can be used to define weighting of inputs in a very flexible manner. Specification of the adjustment to be made can be done with a magnitude, a sign, and a type (e.g. an absolute number for inputs that are numbers, percentage change for inputs that are numbers, or offset step count when the input is chosen from a list), or by other means as will be well understood by those with skill in the art.

6.3.2.8 Analyst Discussion

Exemplary embodiments of the current invention enable analysts to exchange information and opinions in a variety of discussions, such as a general discussion associated with a project as a whole, and in more specific contextual discussions such as discussions associated with each cell of an ACH group matrix, shared QC matrix, or IV matrix. In some exemplary embodiments, contextual discussions are supported for individual information elements. Such contextual and general discussions assists analysts in collaborating and sharing information at many levels of detail during an analysis, with the discussion threads preserved for future reference, whether to ascertain or be reminded of what was discussed, to track the evolution of opinion over time and to determine the causes of any shifts, or to assess the quality of the conclusions reached.

In some exemplary embodiments the Analyst Discussion feature is implemented in whole or in part by means of a project "wiki". A wiki is a system, generally, but not necessarily, implemented as a website, that allows the creation and editing of any number of interlinked documents, such as web pages, via a user interface, such as a web browser, and a simplified markup language. Wikis are often used to create collaborative works, and generally include a feature to maintain a log of changes, including the time and identity of users making a change. Most can also maintain historical versions of all wiki pages for later viewing, and also generally include the ability to limit access for viewing or for making additions or changes to the wiki. Such limitations can be tied to rule- or role-based compartmentalization features of the invention so as to extend compartmentalization to any wiki incorporated into various embodiments.

In some other exemplary embodiments of the invention, the Analyst Discussion feature is implemented using a message system similar to a standard e-mail listserve, where messages are created through the system of the invention, automatically marked as to the scope of the content (e.g. the project as a whole or a specific information element within the project), possibly incorporating links to the project or information element for identification and convenience of the receiving analyst, and made available to other team members. In some exemplary embodiments the messages are made available to all team members. In some other exemplary embodiments, the messages are sent only to team members who have requested, or subscribed, to messages related to the particular message scope. In yet other exemplary embodiments messages are sent only to other team members in roles or groups specified by the sending analyst, or to specific analysts specified by the sending analyst, or to a combination of these. Regardless of how messages recipients are determined, the system of the invention retains or receives a copy of each message and stores it for future reference. Stored messages are tagged with the tags associated with the scope of the information element the messages are associated with, so that the compartmentalization of the message content and scope are maintained.

In yet other exemplary embodiments the analyst discussion feature is implemented using video conferencing, voice streaming, SMS or MMS messaging, e-mail, or any combination of these or other electronic communication methods.

In the system of the invention, the Analyst Discussion feature can be used to permit collaborative sharing of information or information sources, opinions, ideas, images, or other information, and can also be used to assess the quality of conclusions reached by the project team.

6.3.2.9 Annotation of Assumptions

Exemplary embodiments of the current invention provide mechanisms that allow analysts to document some or all of their assumptions relating to each information element, and to make such assumptions visible to other members of the project team for review and comment, subject only to rules used to enforce compartmentalization. In more specific embodiments, for any information element, an analyst can document any assumptions relating to that specific information element. Assumptions and annotations are made available subject to compartment restrictions enforced by the compartment manager.

Knowing what assumptions were made by analysts can be useful for assessing the quality of the conclusions reached. Making documented assumptions available can be useful for resolving differences of opinion between analysts working on an analytic project, and reduce the time to reach a conclusion.

6.3.2.10 Tagging

Information element tagging refers to associating named characteristics with information elements. The named characteristics ("tags") can then be referenced in rules to cause the rule to be applied to the information element so tagged. When an information element is created, whether input by an analyst or computed or generated by the system, tags can be associated with the information element. In the case of information elements generated or computed by the system, such as analyst discussion threads or diagnosticity values, information elements may be assigned tags, or alternatively may inherit the tags of the information elements used in their creation, as defined by the rules governing tagging of created information elements. For example, a diagnosticity value for a given relevant information element may be tagged with the tags of the relevant information element. Doing so preserves the compartmentalization of the source information elements and prevents unwanted transfer of concepts, facts, and conclusions to those without access to the source information elements.

Tags may be defined system-wide, on a project-by-project basis, or on a compartment defined basis. In yet other exemplary embodiments, tags are defined as needed. Project-defined tags are visible only to those who are members of the defining project and who are permitted to see them, or not prohibited from seeing them, by compartment rules.

Part of the system is the automatic application of tags to information elements under the direction of the compartment manager (in accordance with the specific workflow and rules then in effect) when they are accessed, created, and/or stored. These tags may include information describing the information element, the manner of its creation/use, the analyst and/or automated analytic using the information element, any inherited project information, and information elements metadata such as source, date-timestamps, etc.

6.3.2.11 Audit Logging

To enable later review of the progress of an analysis, for analyst training and development, to assess the quality of the conclusions, to permit restoration of a prior state of the analysis, or for other purposes, all analyst inputs, computations, and other activities in the system are recorded in an audit log. Audit entries record the time, analyst identity, and the input, computation, or other activity involved.

Access to the audit data is restricted in the same manner as access to other project data, so as to maintain compartmentalization of information. In most, but not all, cases the project owner will have full access to audit data. In some exemplary embodiments, audit data can be maintained in an encrypted state to limit unauthorized access from within, or from outside of the system of the invention.

6.3.3 Workflows and Project Information

In some exemplary embodiments, the present invention provides for one or more plug-in automated analytics integrated with project-specific workflows. The plug-in automated analytic approach permits the functionality of the system to be extended in order to support additional or differing automated analytics. For example, as additional automated analytics are developed, they can be added to the system and the project-specific workflows adjusted to make the newly added automated analytics available to one or more sets of analysts. While a first exemplary embodiment illustrates implementation of the present invention using plug-in techniques, alternate exemplary embodiments may support additional automated analytics provided by other approaches, such as embedded automated analytics, cooperating software applications operating in a client-server or peer-to-peer architecture, dynamically loaded subroutine libraries, software agents, or other means or combinations of means that are well understood by those with skill in the art, without deviating from the scope of the disclosure.

As will be recognized by those skilled in the art, the plug-in automated analytic architecture coupled with project-specific workflows supports distributed processing, in which one or more automated analytics or other aspects of the system are implemented on distinct processors, with information being made available between them.

Some exemplary embodiments use workflows to provide rule-based and/or role-based guidance for analysts. These workflows may comprise traditional workflow instructions (steps or sequences of steps to be performed), automated analytics specifications, analyst guidance, relevant information specifications, information labeling and tagging specifications, information retrieval, compartment specifications, and/or storage and information routing specifications, authentication and authorization materials, or analysis task specifications. Collectively, each of these items is part of the project information as described below. Workflows of the present invention are differentiated from traditional workflow systems in that they provide contextual information for the operation of the automated analytic and use by analyst along with the workflow instructions, and thus provide one or more of the following: guidance to the automated analytics (and the analysts who use them) as to the process to be followed, information to use as inputs, information required for outputs, and any required labeling, tagging, compartmentalization, or other information required for the analyst to perform their analytic activities using the system. Alternatively, in some exemplary embodiments, a flexible workflow defines rules based upon one or more aspects of the project, for example, rules for each analyst, each group, for each installation of the system, or by the system design. Workflow rules can be customized on an analyst-by-analyst basis, so that different analysts may have different rules associated with each of their workflows. Thus, an analyst can be considered a junior analyst within a first workflow and have a first set of rules defining how the information processed by the analyst is tagged (e.g. tagged as processed by a junior analyst), whilst on a second workflow, the analyst may be a subject matter expert and have his results tagged in a manner reflective of his status.

In some of these exemplary embodiments, portions of the rules comprise suggested workflows and/or information routing, tagging, or labeling instructions. Suggested workflows are helpful to analysts who are not familiar with the system and suggest proven patterns of work that are likely to produce useful results and/or will improve efficiency of the overall analytic process. In other exemplary embodiments, the portions of the rules comprise required workflows. In some environments, analytic or business experience, legal requirements, or quality control or other requirements of the work dictate that specific approaches to analytic activities be taken. Forcing (or suggesting) an analyst or group of analysts to use a particular workflow is also helpful when analysts are not co-located and are working independently. In these cases, requiring analysts to approach the analysis activities in the same manner helps maintain information consistency, coordinate activities, keeps analysts activities synchronized, and facilitates collaboration.

Exemplary embodiments enable connection of the automated analytics such that at least some outputs of at least one automated analytic are automatically made available as inputs to at least one other automated analytic. As described above, the inputs and outputs are defined using aspects of the workflow and may be implemented using communications and/or information sharing techniques well known in the art. Note however, that the workflow provides each of the automated analytics project information required for managing compartmentalization and project-specific labeling and tagging instructions.

Figure 4:
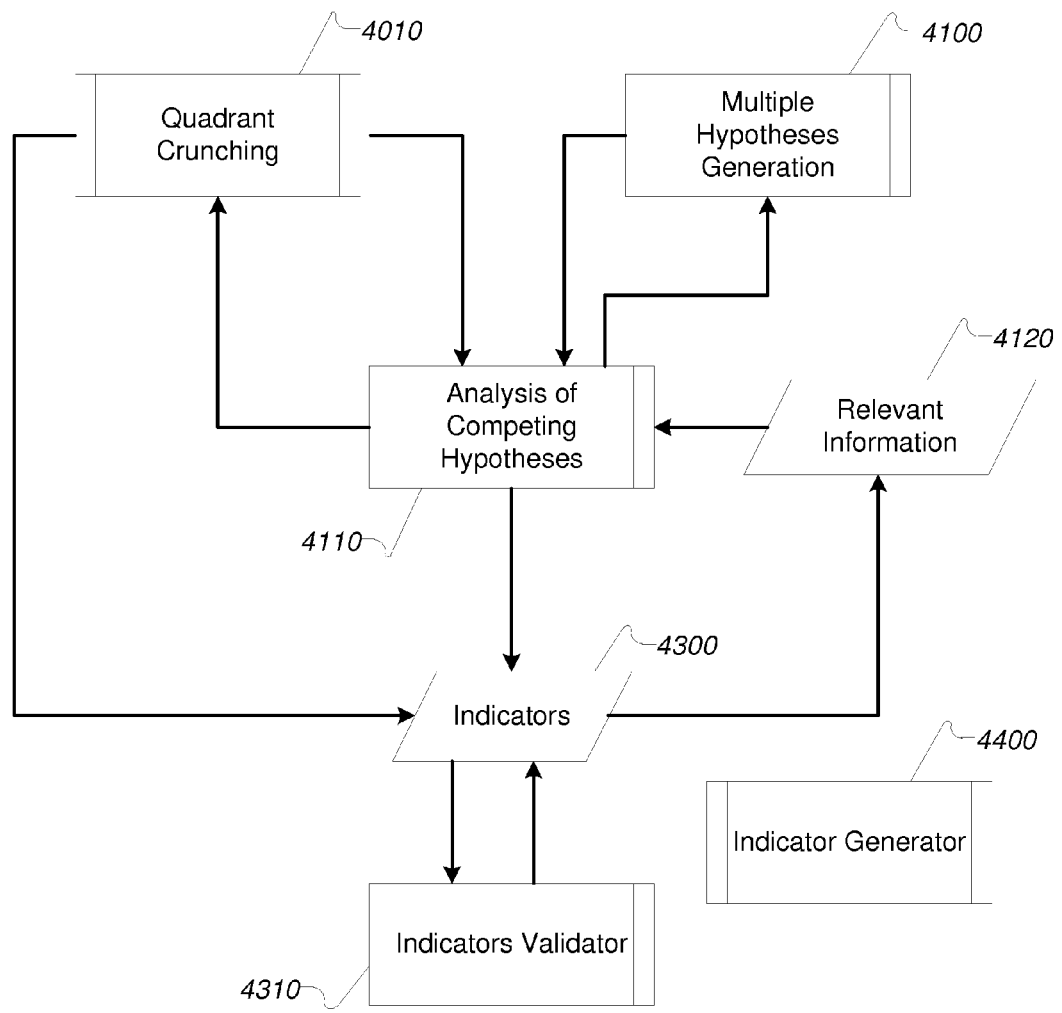
FIG. 4 is a diagram showing exemplary workflows involving a plurality of automated analytics in accordance with an exemplary embodiment of the present invention.

FIG. 4 describes exemplary workflows showing several automated analytics MHG automated analytic 4100, QC automated analytic 4010, ACH automated analytic 4110, IV automated analytic 4310 and automated analytic 4400) and some exemplary, non-limiting, information flows and workflow between them]. Specifically, a first exemplary workflow is shown where the MHG automated analytic (4100) is used to generate hypotheses that are provided to the ACH automated analytic (4110) for evaluation in light of relevant information, and hypotheses from the ACH automated analytic are made available to the MHG automated analytic (4100) to be the basis for generating additional hypotheses. In like manner, hypotheses are made available between the ACH automated analytic (4110) and the QC automated analytic (4010) for generating additional hypotheses for evaluation in the ACH automated analytic. FIG. 4 also illustrates a second exemplary non-limiting workflow where the ACH automated analytic (4110) makes available hypotheses to a plurality of automated analytics, in this example, hypothesis are made available to both the QC automated analytic (4010) and the MHG automated analytic (4100) simultaneously. Each of the QC (4010) and MHG (4100) automated analytics independently generate additional hypotheses and subsequently make available the additionally generated hypothesis to the ACH automated analytic (4110). Additionally, the QC automated analytic (4010) processing generates additional indicators (4300) which are made available to the IV automated analytic (4310) for evaluation and priority ranking for allocation of investigatory resources. Investigation and/or monitoring of indicators can result in additional relevant information (4120), which is made available to the ACH automated analytic (4110) for use in evaluating hypotheses. Note that the workflow and its associated project information enable each of these components to seamlessly compartmentalize, interoperate with, and share information, and for information generated by each of the automated analytics to be automatically compartmentalized, labeled, tagged, and associated with other information elements without requiring analyst inputs.

Additional exemplary, non-limiting workflows involving one or more automated analytics are possible, and those workflows described herein are provided as clarifying examples, and should not be viewed as limiting in any way.

An additional exemplary automated analytic is also shown, Indicator Generator (4400) that uses automated data mining techniques to search various databases (not shown) in order to determine congruencies between historical events and thus automatically identify and create additional indicators, which are then made available to the system. (The IG automated analytic is not shown as part of the above described exemplary workflows.) In this example, the IG automated analytic generates indicators externally (and asynchronously) from the above exemplar workflows and makes these indicators available to other automated analytics as necessary. This demonstrates that automated analytics need not be included in a workflow for them to be used as part of a project, and that contextual information may be provided to automated analytics independently if they are configured as part of a project. Similarly, the example illustrates that all available automated analytics do not have to be included in each and every workflow.

Each of the "making available" operations used within a workflow may implement one or more storing/retrieving, sharing, transmitting/receiving, and/or transferring steps, in which information and/or access to the information is made available set or list of automated analytics. In one exemplary embodiment, the "making available" operation is controlled and/or accomplished by the exemplary automated structured analysis system using project information. Project information comprises copies of, references to, and/or specifications for information required by an automated analytic to perform its function. Examples of project information include information store location, authentication materials, analyst ID (or a set of analyst IDs) to be used for determination of access to, and display of, information, etc., identifying information for one or more second automated analytics or other system components that are sharing with or transferring information with the first automated analytic, identifying information for additional automated analytics that information is to be made available to, identification of the information to be made available (or a copy of it), method of transferring the information elements to and from the automated analytic, tagging and labeling of information elements, as well as any additional information, such as analyst inputs, that may be required or useful to the functioning of the first automated analytic and/or its information handling.

In a first exemplary embodiment, project information is at least initially created and maintained by a User Interface (UI) component is used to collect data required to create project information, such as the analyst ID and the project ID the analyst is working on as well as the workflows, automated analytics, and compartment information to be used. In the first exemplary embodiment, the automated analytics can then alter the project information in ways dictated by their function so as to cause information flow to and from other automated analytics and/or information stores, perform automated tagging and/or labeling, as well as implement information availability in accordance with compartmental and workflow requirements.

In a second exemplary embodiment, at last some project information is at least initially created by a workflow management component. The workflow component is similar to workflow systems well known to those skilled in the art, with the extended workflow mechanisms to manage and make available project information to the automated analytics. In another exemplary embodiment, the workflow system is information driven and invokes automated analytics in a manner which is governed by information stored in the project itself. In some exemplary embodiments, the project information is information related to specific outputs from one or more automated analytics. For example, a workflow may define a series of steps for a process that iterate the steps of: (a) generating and testing hypothesis, (b) generating and associating indicators with hypothesis, and (c) ranking/scoring hypothesis, until one or more hypothesis are identified as meeting a predefined completion criteria.

One of the challenges overcome by the current invention is the ability to address the requirements at the intersection of information sharing and information compartmentalization. Information sharing inherently makes information available. Information compartmentalization inherently limits access to information. One of the challenges addressed by the present invention is the ability to both share information and limit information sharing in the same system. The problem is made harder if the system and/or information is distributed. The workflow system, in which project information is managed within the workflow, and is provided under control of the workflow to each automated analytic, solves this problem by making available to each automated analytic the information it requires to access, process, and store information in accordance with the both the sharing and compartmentalization requirements.

6.3.4 Automated Analytics 6.3.4.1 MHG Automated Analytic

Some exemplary embodiments of the current invention comprise automated analytic(s) for the generation of hypotheses. One such automated analytic is based upon the manual Multiple Hypotheses Generation (MHG) techniques, provided commercially as Multiple Hypothesis Generator™ (Pherson Associates, Reston Va.). The MHG automated analytic quickly generates large numbers of plausible, mutually exclusive hypotheses, in a manner that is not easily subject to analyst bias, and that cover a wide range of possibilities.

Figure 5:
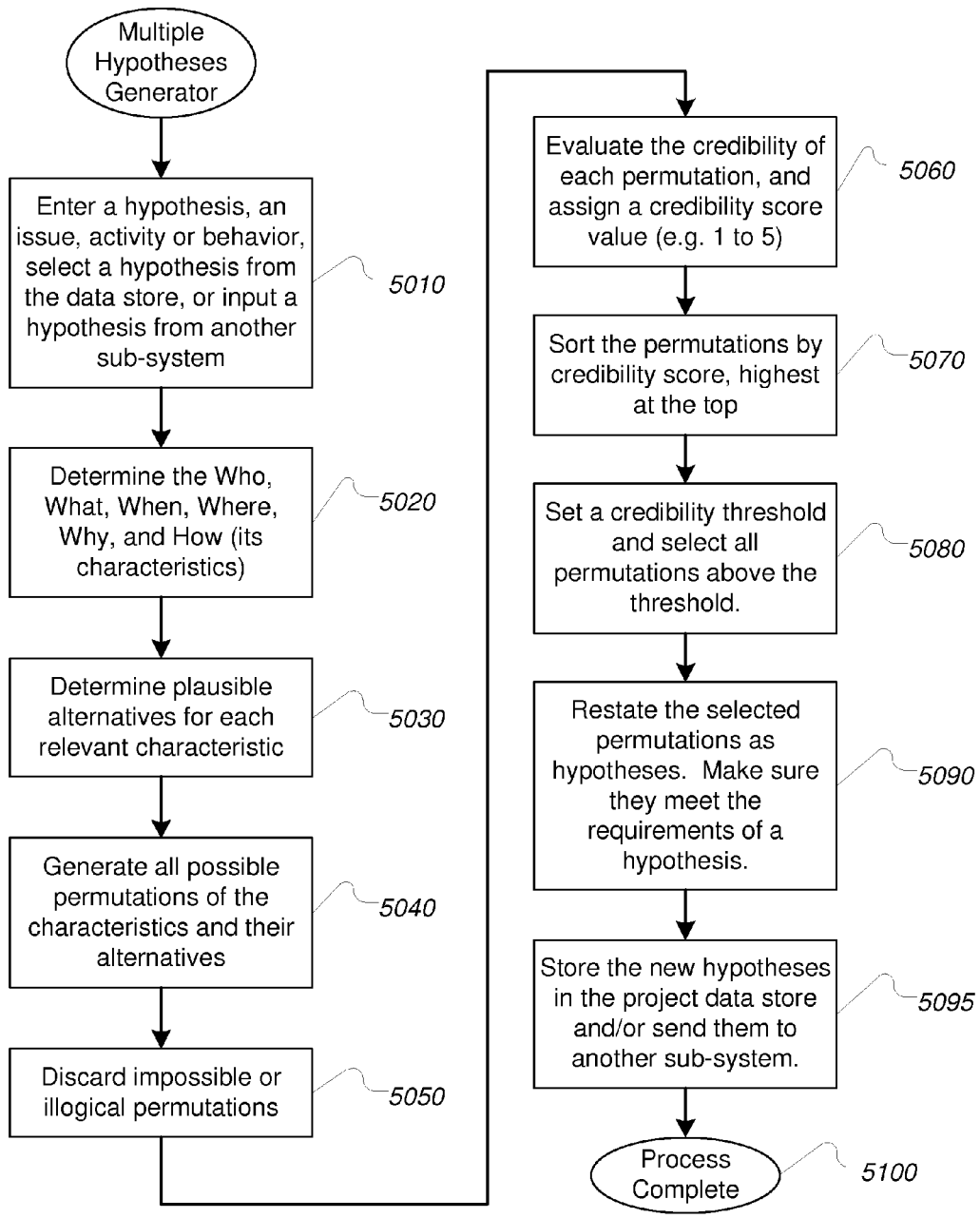
FIG. 5 is a flowchart of the steps of the MHG automated analytic component of an exemplary automated structured analysis system, in accordance with one embodiment of the present invention.

The steps comprising MHG automated analytic of the present invention are illustrated in the flow chart of FIG. 5. The MHG automated analytic selects, or has selected for it, compartment-filtered information elements (generally a hypothesis) or an issue, activity or behavior of interest, for use as inputs (5010). An activity or behavior of interest may be: defined explicitly, either by an information element or user input, be the outcome of a query, a rule, or be the result of a filtering process applied to the output of other automated analytic(s). The selected input can be an information element, or elements, made available from another automated analytic, such as an ACH automated analytic, be acquired from the project information store, or be input by an analyst. In some embodiments, the initial input is derived by selection from among the hypotheses being tested in an ACH automated analytic. In some of these exemplary embodiments the selection is automatically made (e.g. based upon analyst rankings, the hypothesis best supported by relevant information, a hypothesis randomly chosen from among those hypotheses with support above a threshold level, etc.), while in other cases, the selection is performed by an analyst. The characteristics of the input are then determined (5020). Exemplary embodiments of the current invention also provide automated support for determining the characteristics of the inputs. Characteristics may be determined by an automated process, a semi-automated process, or an automation-assisted process such as querying analysts with questions about the selected hypothesis, issue, activity, or behavior, to determine its characteristics and recording their responses. Analysts can be queried as individuals, or as groups. In some exemplary embodiments, the questions used are built into the system or are configured as part of a project, or as part of a template. In an embodiment, exemplary questions are be based on the standard journalist's questions, "Who, What, Where, When, Why and How?"; however, they can be any other questions determined to be useful by those with skill in the art. Automated forms of questions may be expressed in languages appropriate to the automation, such as a query language such as SQL or one of the XML-based query languages.

Plausible alternatives for each characteristic are then determined (5030). Each alternative characteristic, plausibility assessment, or set of characteristics and assessments may be generated by an analyst or automatically generated by the MHG using techniques such as lookups of previously known results, evaluation of queries, expert systems, data mining techniques, semantic parsers, rule-based knowledge bases and ontologies, and/or a combination of these methods. Input of plausible alternatives to the characteristics may also be input by analysts. Generated alternatives or alternatives input by analysts can be automatically and/or manually tagged as specified for the compartment.

All permutations of plausible alternatives are then generated (5040). It should be noted that the number of generated permutations can be high, and the steps of determining and recording each permutation and the determination of its plausibility, along with all of the required controls and associated information required to support collaboration and compartmentalization is challenging without the flexible, project-based rules and automation provided by the automated analytics.

Once all permutations of the plausible alternatives are generated, those permutations that are illogical or make no sense are discarded (5050). The determination of which permutations to discard is made by analysts, or by use of automated means, such as where permutations match a specific rule defined for the project, or using automation systems such as a rule-based expert system. The remaining permutations are then rated for credibility in accordance with a project-specific rating scale. The rating process may be conducted using various rating methods, for example, in parallel with each analyst independently rating the set (or subset) of the remaining hypothesis, in series, with each analyst rating some or all of the set, using the first available analyst, or least recently utilized analyst, or in random order. Automated rating methods using rules defined within the system are also envisioned.

For example, the score may be assigned using a 0 to 5 point scale, where 0 indicates that the permutation makes no sense at all, and values from 1 to 5 indicate increasing plausibility. In exemplary embodiments where rating permutations and marking those that do not make sense is a separate step, the rating scale used might be from 1 to 5 instead. In yet other alternate embodiments the rating scale can comprise other values, such as alphabetic (e.g. A-Z, highest to lowest, colors, real numbers, or percentages). Credibility rating methods and scores are project defined and may vary from project to project.

The credibility ratings from a plurality of analysts may be averaged to calculate a credibility score for each permutation (5060). The permutations may be optionally sorted by credibility score (5070). Automated application of rules for data manipulation, including those for combining unlike rating schemes (a first set of items are rated numerically 1-5, and the second set are rated using names), enable the automated processing of information elements by an automated analytic.

Once those permutations rated for exclusion are made available for further processing, the MHG automated analytic optionally filters them from the set of permutations made available for subsequent use. In some exemplary embodiments the filtered permutations are discarded. In other exemplary embodiments the removed permutations are not used in further MHG processing. For example, the removed permutations may be displayed (as "grayed out" or otherwise removed from analyst view). In some alternative exemplary embodiments, the rating of permutations that do not make sense is combined with the following step of rating permutations for credibility.

In some exemplary embodiments, when a permutation is rated as making no sense, or being below a specific threshold (e.g. a score of 0 meaning that the combination makes no sense at all), the MHG automated analytic records an associated annotation as to the reason. The annotation may be machine generated or based upon an analyst's response. In some exemplary embodiments, other permutations that match the reason given are also assigned the same rating and reason automatically. For example, if an analyst indicates that a permutation's "Who" is not capable of doing the permutation's "What", then all permutations that include the particular "Who" and "What" are given a credibility of 0 automatically, and annotated with the response indicating that the "Who" is not capable of doing the "What". Similarly, if a given "What" cannot be performed at a given "Where", then all permutations comprising that "What" and "Where" get a credibility of 0 and an annotation that the "What" cannot be performed at the "Where". This substantially reduces the number of permutations that progress to the next level of processing.

The remaining permutations with credibility score above a (possibly different) defined threshold credibility score are selected for conversion into hypotheses (5080). The sorting method and threshold can be configured for the system. In some cases, threshold is defined by the design of the system in some exemplary embodiments. In alternative exemplary embodiments, the threshold is defined at system installation, or for each project. In yet other exemplary embodiments, the threshold is calculated automatically using statistical methods, determination that ratings are clustered in distinct groupings, with the threshold selected being between two such clusters, or by other means as determined to be proper by those with skill in the art.

Finally, the surviving permutations are restated as hypotheses (5090), and are made available to other processes in the system. In some cases, the converted hypotheses are added to the project information store (5095). In some exemplary embodiments, the conversion of permutations into hypotheses is done automatically. In other exemplary embodiments, the conversion is performed under an analyst's guidance and the resulting hypotheses are input into an automated analytic (5095).

After the new hypotheses are made available, the process completes (5100).

In some exemplary embodiments, the system may optionally associate additional indicators or relevant information when the new hypotheses are created. These additional information elements may be added by authorized analysts, with review and approval as required, and with optional tagging to maintain required compartmentalization, or by automated means such as embodiments that determine additional indicators or relevant information using rule-based knowledge bases, expert systems, ontologies, pattern matching, semantic analysis, or combinations of these or other techniques well understood by those with skill in the art.

Regardless of how the hypotheses are generated, they must be recorded, associated with other information, such as relevant information, analyst ratings, analyst comments, etc., be examined for plausibility, both initially and as relevant information is acquired, be considered relative to each other for likelihood in light of relevant information, and otherwise worked with over the course of an analysis. Exemplary embodiments that implement MHG automated analytics comprise mechanisms to compartmentalize information and ideas and to enforce this compartmentalization while optionally enabling the sharing of results and outcomes between analysts, without disclosing compartmentalized source information.

6.3.4.2 ACH Automated Analytic

The ACH automated analytic provides automated means for evaluating a plurality of hypotheses against relevant information to determine which hypotheses are supported by the relevant information and which are not. It incorporates the concept of "diagnosticity" for relevant information, where the more hypotheses a given item of relevant information is consistent with, the less diagnostic that relevant information element is.

In one embodiment, the ACH automated analytic process comprises the following steps:

- Identify potential hypotheses. A hypothesis is a testable proposition about what is true, or about what has happened, is happening, or will happen. A good hypothesis is worded as a positive statement that is testable and disprovable, and that is consistent with all relevant information. A good set of hypotheses meets two tests. The hypotheses cover all reasonable possibilities, including those that seem unlikely but not impossible. And the hypotheses should be mutually exclusive. That is, if one hypothesis is true, then all other hypotheses must be false.
- Arrange relevant information as rows in a matrix, and hypotheses as columns in the same matrix.
- In each cell of the matrix, rate how consistent the relevant information for the row is with the hypothesis of the column.
- Compute the diagnosticity of each item of relevant information.
- If there is insufficient relevant information that is sufficiently diagnostic to reach a conclusion, collect additional relevant information and repeat the process. Additional relevant information can be collected by identifying indicators that are associated with one or more hypotheses.
- Hypotheses that are inconsistent with relevant information are discounted. Hypotheses that are most consistent with relevant information are good candidates for use in MHG or QC automated analytics to help ensure that all reasonable hypotheses have been considered.
- Test conclusions using sensitivity analysis, which weighs how the conclusion would be affected if key relevant information or arguments were wrong, misleading, or subject to a different interpretation. The validity of the most diagnostic relevant information and the consistency of important arguments are double-checked to assure that the conclusions' support is sound.
- Report the lead hypothesis or hypotheses, as well as a summary of alternatives that were considered, and why they were rejected. Identify relevant information sources from the process that can serve as indicators in future analyses.

One aspect of the ACH automated analytic is the generation, use, and maintenance of an ACH matrix to represent analysts' analysis of hypotheses with respect to relevant information. An advantage of the ACH automated analytic is that it scales well with large numbers of hypotheses and relevant information because automated analysis and filtering limits the number of hypotheses and the amount of relevant information that is made available to an analyst, and that the provided information is the most relevant to the current analysis activity. Similarly, the ACH automated analytic supports the use of a plurality of compartmented ACH matrices, each filtered for specific uses as defined by their compartments, which reduces analyst workload. The ACH automated analytic provides automated merging of results without introduction of bias. This permits analysts to work independently when necessary, and then combines their results automatically with automated analytic results, and provides the resulting matrices of combined results for subsequent use.

The ACH automated analytic also provides rule-based weighting of inputs, rule-based combination of results, scoring of information elements and subsequent combination of these scores and results to produce aggregated scores and results, and the compartment-controlled association with and/or automated evaluation of other information element types (e.g. indicators and assumptions).

The ACH automated analytic of exemplary embodiments contains functionality that implements the ACH technique using information elements entered into the information store, permits entry and alteration of information in the information store, and supports common collaborative features of the exemplary embodiments, such as analyst discussion, filtering and survey processing.

Figure 6:
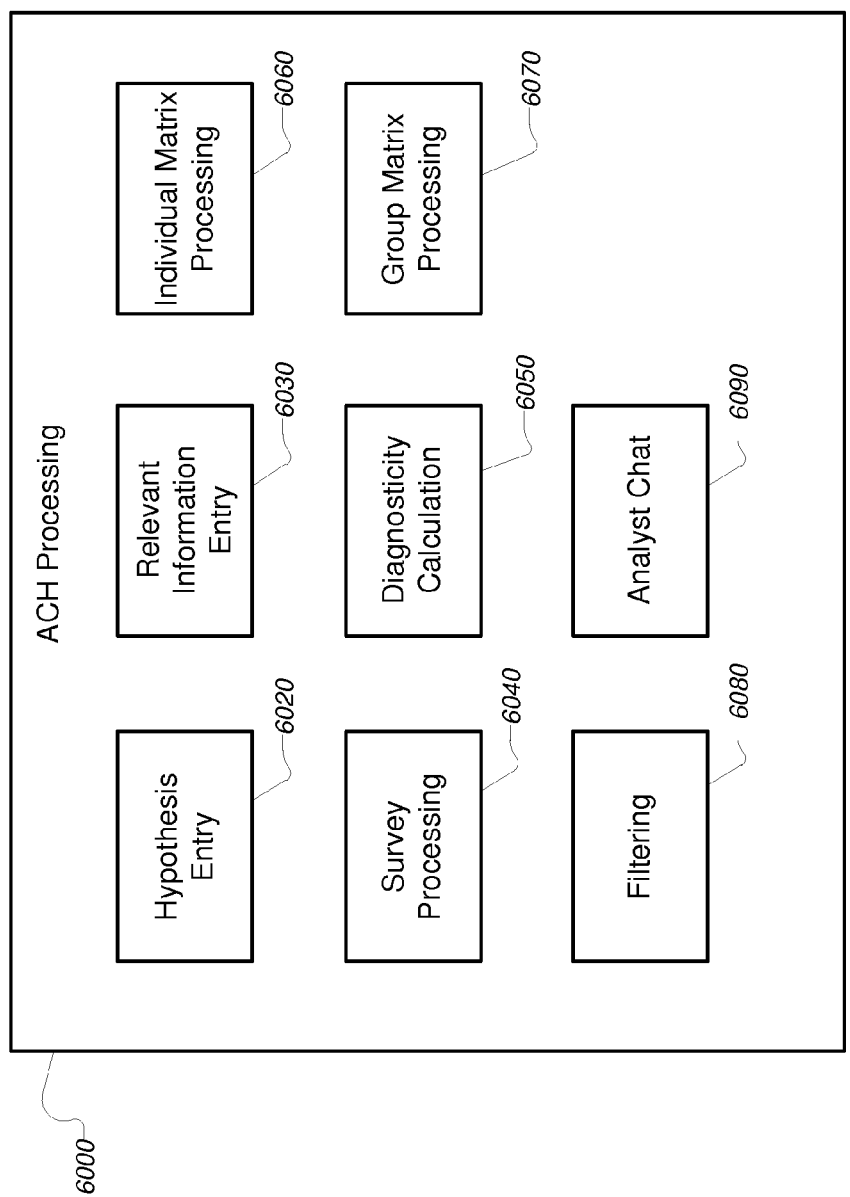
FIG. 6 is a diagram showing functionality supported by the ACH automated analytic component of an exemplary automated structured analysis system, in accordance with one embodiment of the present invention.

FIG. 6 is a diagram showing the major functions of the ACH automated analytic (6000). These are Hypothesis Entry (6020), Relevant information Entry (6030), Survey Processing (6040), Diagnosticity Calculation (6050), Individual Matrix Processing (6060), Group Matrix Processing (6070), Filtering and Sorting (6080), and Analyst Discussion (6090).

Hypothesis Entry (6020) supports entry and updating of hypothesis records associated with a project. In some exemplary embodiments, entering these records is governed by compartment rules. In some exemplary embodiments, analysts who are not authorized by compartment rules to perform enter and/or update these records may enter suggested these records that must be approved an authorized analyst before they become visible to or usable by other team members (for example, for use in a group matrix).

Relevant information Entry (6030) enables entry and updating of relevant information records for a project. In some exemplary embodiments, entering these records is governed by compartment rules. In some exemplary embodiments, analysts who are not authorized by compartment rules to enter and/or update these records may enter suggested records that must be approved by an authorized analyst before they become visible to or usable by other team members (for example, for use in a group matrix).

Survey Processing (6040), provided by some exemplary embodiments, provides an automated process that reduces cognitive bias when assigning consistency ratings to relevant information vs. a particular hypothesis. In some exemplary embodiments, the process involves identifying an analyst from whom one or more consistency ratings are needed, selecting one or more pairings of a hypothesis and an item of relevant information for which consistency ratings are needed from the identified analyst, randomly generating the order in which the ratings of specific pairings of a hypothesis and relevant information are requested from that analyst, and then, using a notification method, requests a rating, optional assumptions, and any other required information for the specified pairing from the analyst. As will be appreciated by those having ordinary skill in the art, the Survey Processing mechanism of exemplary embodiments of the current invention can reduce the vulnerability of an analysis to unwanted cognitive bias by presenting the matrix cells to be rated in random order, so that each analyst encounters the decisions differently and with a different mental context.

Individual Matrix Processing (6060) deals with handling of individual analyst matrices for display of ACH information elements that is within any compartments that the individual analyst belongs to, as well as entry of the analysts own inputs into the ACH processing (e.g. consistency evaluations, suggested additional hypotheses or relevant information, suggested indicators, discussion elements) These matrices are similar to the group matrix, but contain only ratings of a single analyst, rather than the team consensus information of the group matrix.

Survey Processing (6040) also supports the evaluation of ACH matrix cells over time by permitting an analyst to begin evaluating an ACH matrix, end the session before completion, and return at a later time to complete more of the ACH matrix until the entire matrix has been evaluated. Progress indication is displayed in the individual matrix display to show the analyst what percentage of the cells have been evaluated, and what percentage remains to be evaluated. In some exemplary embodiments, the evaluation status for one or more individual analysts can be displayed in the group matrix, so that the team's overall progress can be tracked, and any analysts that are holding up progress can be identified.

Diagnosticity Calculation (6050) supports calculation of the diagnosticity of one or more relevant information elements with respect to the current set of hypotheses. Diagnosticity is used to sort individual and group matrices, for example so that the relevant information with the highest diagnosticity is located in the top row of the group and individual matrices.

Group Matrix Processing (6070) supports handling of the group matrix by constructing the group matrix and storing it in the information store. The group matrix displays current project hypotheses in columns, and relevant information in rows. The intersection of a hypothesis column and a relevant information row is referred to herein as "an ACH cell", and is used to input and display information elements and/or links to information elements concerning the cell (for example, consistency ratings, discussion data, assumptions related to the cell), ion elements or user interface elements required.

In some exemplary embodiments, the present invention provides a group matrix that is configured to display a depiction of collected and computed information elements from one or a plurality of analysts, aggregated using an aggregation algorithm that collects a rule-defined set of information elements, typically a set of individual analyst assessments, assumptions, and other inputs, and uses these to generate a rule-defined consensus view of the assessments, assumptions, and other inputs from this rule-defined set of analysts, and maps these to cells in a matrix display that resembles an ACH matrix. In more specific embodiments, the information comprising the group matrix is filtered, sorted, and aggregated in accordance with one or more compartment rules. In yet more specific embodiments, the resulting matrix display presents the aggregated results in a form or format consistent ACH matrix. As will be understood by those having ordinary skill in the art, such a group matrix presentation differs from an individual ACH matrix presentation with respect to the information presented, and the underlying assumptions and conclusions that can be drawn therefrom. An individual ACH matrix presentation includes only those information elements specified by a particular individual analyst, a group ACH matrix is a collection of elements aggregated and filtered using one or more aggregation and filtering rules. This has the effect of enforcing compartmental segregation of information while enabling distributed processing and collaboration between analysts.

In some exemplary embodiments, changes in information elements stored in the information store will automatically result in the group matrix being updated. In other exemplary embodiments, the group matrix is generated when needed, and no such updating takes place.

In yet other embodiments, one or more rules that describe the processing of group matrix presentations are provided; these may include information element inclusion/exclusion rules that define the information elements eligible for inclusion in the group matrix display, inclusion/exclusion rules based upon analyst identity, group memberships, or other criteria, and/or filtering and sorting calculations, as well as specific calculations for determining one or more derived values based upon the information provided in one or more information elements.

The group matrix displays information in the context of a team analyst for purposes of maintaining compartmentalization of information. If a specific analyst identity to use for determining what to display and what to exclude has not been specified, the group matrix display is limited by filtering (6080) to showing only those information elements that are visible to all team analysts.

In another particular embodiment, the invention provides a cell rating calculation, which is configured to combine one or more aspects of the team members' ratings for the consistency of each item of relevant information or indicator with each hypothesis the relevant information or indicator is relevant to. An example of such a rule might define ratings and their aggregation weighting values as follows:

CC=2
C=1
NA=0
I=1
II=2

Where "CC" means "very consistent" and has an aggregation weighting value of two, "C" means "consistent" and has an aggregation weighting values of one, "NA" means "not applicable" and has an aggregation weighting values of zero, "I" means "inconsistent" and has an aggregation weighting values of one, and "II" means "very inconsistent" and has an aggregation weighting values of two. The aggregation weighting values associated with the ratings given by each team member are summed for each of the above categories. The category (CC, C, NA, I, or II) that gets the highest total rating is recorded for that cell in the group matrix. A tie involving IIs and Is (for example, 2 "II"s and 4 "I"s), goes to the "II". The same is true for ties between "CC" and "C"s. Because "II" and "CC" are relatively rare, it is useful to capture this situation in the group matrix when it does occur. A tie between "I"s and "C"s goes to the "I", based on the fact that the methodology is designed to identify "I"s rather than "C"s. A tie involving "C" and "NA" defaults to "C" and a tie involving "I" and "NA" defaults to "I".

In some exemplary embodiments, artificial intelligence techniques, such as expert systems, rule-based knowledge bases, pattern matching, or others, can be used to suggest consistency ratings. For example, if a hypothesis suggests that an item was stolen, relevant information that it was destroyed would be inconsistent, and this type of conclusion can be determined automatically in at least some cases. Such automated rating of consistency can speed up the work of rating all cells in an ACH matrix, as well as reducing analyst errors when the automatic consistency rating is used only as a suggestion.

Alternative embodiments can define different ratings and weighting factors in their rule sets as required.

Filtering (6080) supports inclusion or exclusion of information from display or processing, such as the Group Matrix Processing (6070), based on a variety of factors as may be defined in rules specifying the filtering of information. Filtering may occur in the compartment manager, and/or in the presentation of the automated analytic. Analyst Discussion (6090) supports entry, recording, display, searching, editing, annotating, and reporting of context-dependent discussions between analysts about aspects of a project, such as hypotheses, relevant information, assumptions, the project as a whole, etc. The Analyst Discussion component within an ACH automated analytic provides project information and the user interface specifics needed to associate analyst messages with specific aspects of ACH processing, such as a particular hypothesis, ACH matrix cell, or relevant information element, and to associate analyst messages with context-specific compartmentalization rules.

Collaboratively generated and stored relevant information evaluation, hypothesis suggestion, and discussion results provide additional opportunities for automated analysis of relevant information or hypotheses, and may detect trends in their evolution over time, and this may help guide the search for additional relevant information, or be used to assess the quality of the conclusions reached by the project team.

The collaborative mechanisms described herein may also provide an opportunity to capture and present historical views of the ACH automated analytic, relevant information, hypotheses, and analyst evaluations at particular times. These historical views may take the form of "point in time" snapshots of the information elements and/or released versions of particular analysis results. In either case, the historical views may be captured using methods such as associating a tag with a particular set of historical information elements and then allowing the group matrix to filter based at least in part upon such tags.

Some exemplary embodiments of the system of the invention automatically analyze and produce assessments related to one or more aspects of information elements under rule-based controls. For example, the system can use the diagnosticity of relevant information and the analyst-supplied consistency ratings for relevant information to hypotheses to identify the relevant information that is most influential in judging the available hypotheses and which hypotheses are best supported by available relevant information. Analysts can use the system of the invention to discover where there are differences of opinion within the team and, more importantly, whether major differences exist regarding the most discriminating relevant information elements, and thereby determine who is disagreeing and employ a collaboration mechanism such as Analyst Discussion, to explore the reasons for their differences. As a remotely usable, multi-user system and method, exemplary embodiments of the current invention reduce the risk of groupthink by enabling analysts to work alone initially, providing each user with his or her own ACH matrix, and preserve the individual viewpoints independent of the group consensus. Exemplary embodiments also enable a group of users to work together when appropriate, with the group consensus clearly and flexibly shown in a group ACH matrix and associated information displays.

6.3.4.3 QC Automated Analytic

The QC automated analytic provides an automated mechanism for generating additional hypotheses by challenging key assumptions in current hypotheses.

Figure 7:
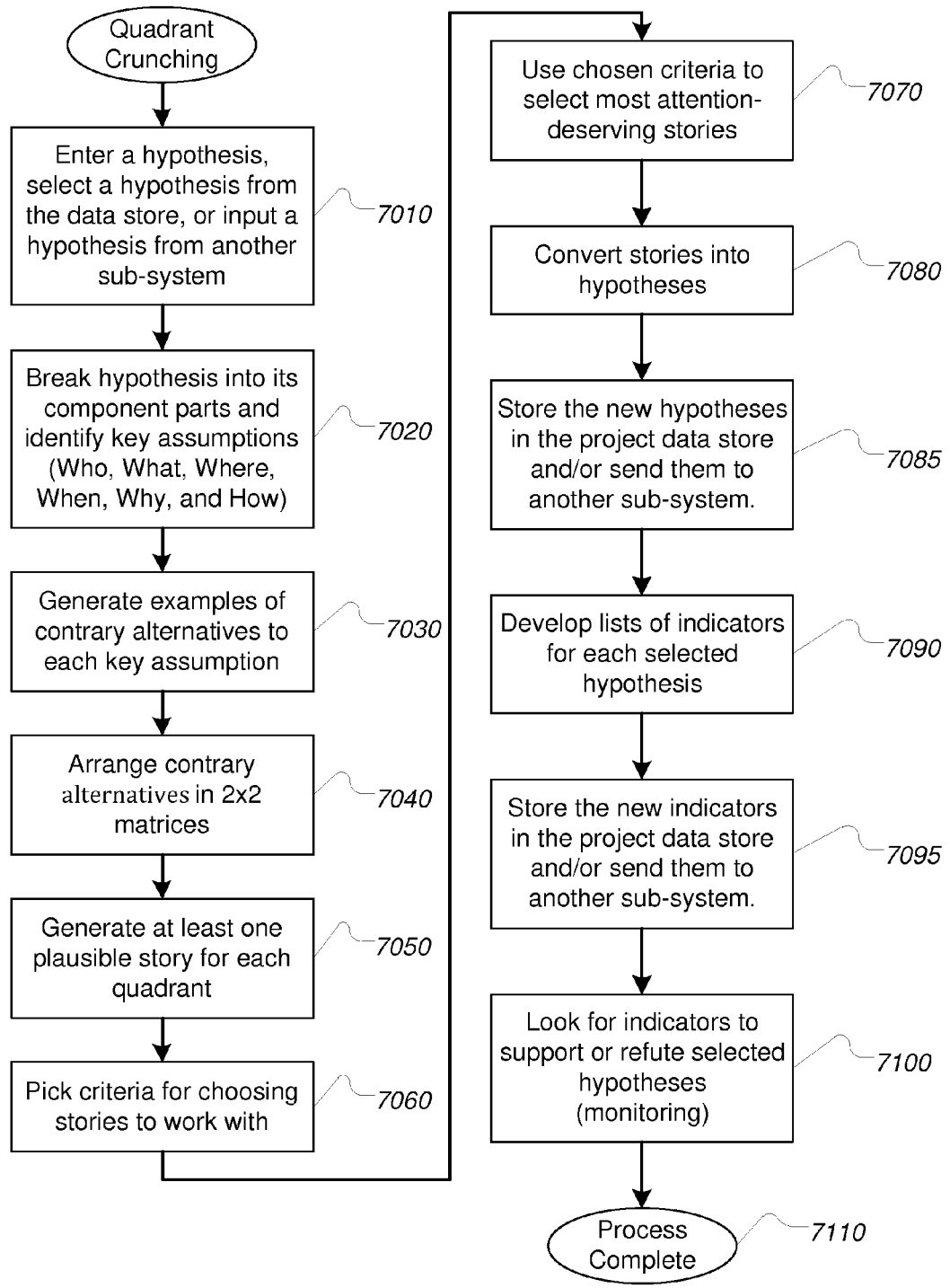
FIG. 7 is a flowchart of the steps of the QC automated analytic component of an exemplary automated structured analysis system, in accordance with one embodiment of the present invention.

FIG. 7 is a flowchart showing the basic steps of the QC automated analytic. The first step (7010) is to select a hypothesis from among those under consideration. This can be made available by another automated analytic, acquired from the project information store, or input by an analyst. The hypothesis thought to be most likely at the time is referred to herein as the "lead" hypothesis. For example, if the problem is to figure out where the money from a local bank vault went, and given relevant information from witnesses and security cameras showing three armed robbers taking the money, the lead hypothesis might be that three armed robbers entered the bank, threatened customers and staff with weapons, were given the money, and left with it.

The lead hypothesis is broken down into its component parts and its key assumptions are identified (7020). The lead hypothesis about the three armed robbers, would break down into component parts of "three robbers," "who are armed," "threatened customers and staff," "were given the money," and "left with the money." The key assumptions for these components are that there were exactly three robbers, that they were armed, that they threatened the customers and staff, that they were given all of the missing money, and that they left with the missing money.

Once the key assumptions are identified, at least two contrary alternatives are generated for each key assumption (7030). For example, rather than three robbers there might have been a fourth robber outside the bank, or there might have been an accomplice inside acting as a customer, or as a staff member. The robbers might not have been armed . . . the weapons might have been fakes. They might not have threatened the customers and staff, but might have offered them a share of the money if they'd cooperate. Rather than the robbers getting all the missing money, perhaps a cashier hid some of the missing cash inside the bank for later retrieval thinking that the robbers would be blamed for it too, or perhaps the robbers left some cash for the customers and staff as part of a deal to cooperate. Perhaps rather than leaving, they just changed clothes and blended in with the customers, or perhaps they hid inside the bank somewhere.

Figure 8:
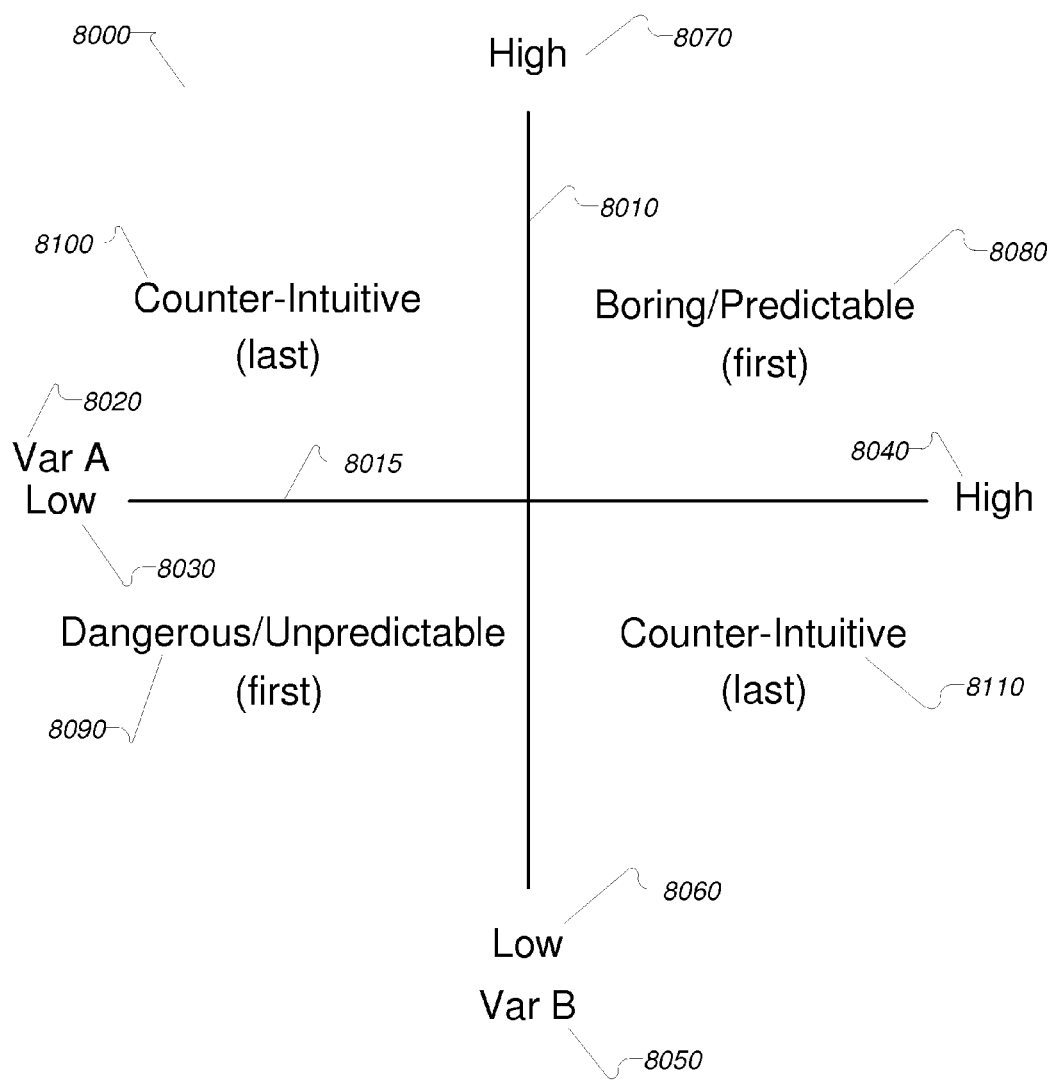
FIG. 8 is a diagram showing an exemplary 2×2 matrix as used in the QC automated analytic component of FIG. 7.

Once the pairs of contrary alternatives have been generated, each pair is matched with each other pair and the two pairs are arranged into a separate 2×2 matrix (7040) such as that shown in FIG. 8. A pair of contrary alternatives is referred to in FIG. 8 as either Var A (8020) or Var B (8050)). Var A (8020) and Var B (8050) are arranged in a 2×2 matrix (8000) with one pair of contrary alternatives represented by the x axis (8015) and one pair represented by the y axis (8010).

Each pair of contrary alternatives (Var A (8020) or Var B (8050)) consists of either two distinct entities or as a two points on a single continuum spectrum. If the two contrary alternatives are points on a continuum, then the larger or more positive alternative is positioned at either the top of the y axis (8070) or the right-hand end of the x axis (8040). The smaller or more negative alternative is positioned at either the bottom of the y axis (8060) or the left-hand end of the x axis (8030). The choice of which axis to place the pair on can be made arbitrarily. If the two contrary alternatives making up a pair are not points on a continuum, but are simply two distinct alternatives, the positioning on the chosen axis can be arbitrary. For example, one contrary alternative pair (Var A (8020)) for a given matrix might concern the number of robbers (two more outside (a lookout and a getaway driver), or an accomplice inside, incognito), and the other contrary alternative pair (Var B (8050)) might be whether they took all the money or a cashier hid some for himself). In determining the relative locations for each pair on their axis, the number of robbers pair represents two points on a continuum, with the smaller of the pair being four and the larger being five. The five robbers alternative is placed at the right-hand end of the x axis (8040), and the four robbers alternative is placed at the left-hand end of the x-axis (8030). The other pair (Var B (8050) is placed on the y axis (8010) with the "took all the money" alternative arbitrarily placed at the high end (8070), and the "a cashier hid some for himself" alternative placed at the other end (8060). This results in all four possible combinations of the two pairs of contrary alternatives existing in one quadrant or another of the 2×2 matrix (8000).

In many cases, though not in all, the upper right quadrant (8080) will comprise the two most likely contrary alternatives. In our example, this would be that there were two additional robbers outside the bank (a lookout and a getaway driver) and that the robbers took all the money with them. This is a fairly obvious possibility, and shows that the upper right quadrant tends to be fairly boring/predictable.

In many cases, though not in all, the lower left quadrant (8090) has the two least likely, or troublesome, contrary alternatives. In our example, this would be that there was an accomplice inside the bank, and that a cashier hid some of the money for himself. This is not very likely, but if it were the case, it would be surprising, and in other situations, it might be the most dangerous possibility due to its unexpectedness. In most cases it is worthwhile to consider the upper right and lower left quadrants first, as they are either the most likely or the most unexpected possibilities.

The upper left (8100) and lower right (8110) quadrants often contain counter-intuitive combinations, and generally are considered last. In our example, these would be an accomplice inside the bank, and the robbers taking all the money with them for the upper left quadrant (8100), and there being two more robbers outside and a cashier hiding some of the money for himself in the lower right quadrant (8110).

Returning to FIG. 7, once the contrary alternatives are arranged in the 2×2 matrices (7040), the next step is to create a plausible story for each quadrant (7050) that combines the contrary alternatives. For example, in the current example case, a plausible story could be developed for the lower left quadrant (accomplice inside and a cashier hid some of the money) where the accomplice was a cashier who hid some or all of the money while the other three robbers escaped. At least one plausible story is needed for each quadrant of each 2×2 2×2 matrix, but additional stories can be optionally developed and included.

In most cases, resources for investigation are limited, so criteria are selected for deciding which stories are worth investing the resources to investigate (7060). Criteria in the current example might include highest chance of recovering the money, lowest chance of not recognizing all involved criminals, or easiest to verify or rule out. Once the criteria are chosen (7060), the stories are examined and those meeting the criteria are selected as deserving the most attention (7070). The selected stories are then converted to hypotheses (7080), making sure that each meets the criteria for a hypothesis, and stored (7085) in the project information store. The new hypotheses can optionally be made available to another automated analytic, such as an ACH automated analytic (7085).

The next step is to develop indicators (7090) for each new hypothesis and store them (7095) in the project information store. The new indicators can optionally be made available to another automated analytic, such as an IV automated analytic (7095). Indicators can be used to collect relevant information that can change the validity of the various hypotheses under consideration. If indicators associated with a hypothesis change, the new information provided can change the set of hypotheses it is deemed worth paying attention to. For example, an indicator for the hypothesis where one of the cashiers was an accomplice of the robbers might be an upward change in spending habits of one of the bank's cashiers. If a clerk at the bank suddenly starts spending at a rate inconsistent with past expenditure rates or with known income levels, that might indicate that the clerk took some of the missing money, or was an inside accomplice of the robbers and was paid off later and make hypotheses involving either idea more likely.

The indicators are then investigated or monitored to collect relevant information that may support or refute one or more hypotheses (7100), which completes the QC process (7110).

QC tends to generate large numbers of hypotheses, each of which has associated indicators, but the recording and manipulation of the contrary assumptions, 2×2 matrices, stories and generated hypotheses as well as the indicators associated with them can be prohibitive when the technique is done manually. Also, QC can suffer from some of the same types of biases as ACH. For example, consideration of one 2×2 matrix can result in a mindset that has effects on the following 2×2 matrix considerations. Use of the survey technique when presenting 2×2 matrices to analysts can reduce such effects. Collaboration, with individual analysts or subsets of the analysts working on a project determining contrary alternatives or evaluating 2×2 matrices separately, can reduce the "groupthink" bias effect and result in a wider range of alternatives and stories Support for compartmentalization of information and weighting of judgments during the QC process also enhance the utility of the method.

At least some exemplary embodiments of the current invention comprise a QC automated analytic that provides a structured mechanism for generating hypotheses, with automated means to reduce analyst workload, maintain compartmentalization of information, support filtering and weighting of inputs and outputs, and record actions for future review or use in assessing the quality of conclusions.

Exemplary embodiments of the current invention provide automated support for input of the selected initial hypothesis. In some embodiments this initial input can be derived by selection from among the hypotheses being tested in an ACH automated analytic. In some of these exemplary embodiments the selection is automatic (e.g. the hypothesis best supported by relevant information, randomly chosen from among those hypotheses with support above a threshold level, etc.), while in others of these exemplary embodiments the selection is performed by an analyst using methods well understood by those skilled in the art of computer user interface design, such as clicking the item with a mouse, tabbing a cursor to the chosen item and pressing a return key, touching an item on a touch screen, or any other means in common use.

Exemplary embodiments also provide additional automated support for analyst tasks at several levels. The basic level of automated support automates such tasks as recording assumptions and contrary assumptions for each hypothesis while promoting collaboration between analysts whether co-located or working remotely from each other, generating all permutations of the pairings of assumptions and contrary assumption pairs, recording the high/low ratings for each member of each contrary assumption pair, presenting the 2×2 matrices for evaluation to the appropriate analysts to maintain compartmentalization of information in the order specified by the method configured for the project, recording the generated stories for each quadrant of each matrix, and recording the indicators developed for each new hypothesis for automatic transfer to the IV automated analytic. Additional basic automation includes functionality to permit collaborative generation of hypotheses and indicators, recording discussion elements associated with specific matrices or hypotheses, and presentation of resulting hypotheses and indicators for use by analysts or other software with filtering to maintain compartmentalization of information, and optional filtering, for example to support comparison of results between analysts, groups, roles, or combinations of these.

In some exemplary embodiments a more advanced level of automation can comprise a rule processing function combined with a knowledge base, for example in the form of rules created by subject matter experts (SMEs), along with a natural language processing function in order to assist analysts with additional QC tasks. The natural language processing function can parse hypotheses to determine possible assumptions based on the sentence structure of an input hypothesis. For example, "Three bank robbers threatened customers and staff with weapons, took the money and left with it" could be parsed automatically into "three bank robbers", "threatened customers and staff with weapons", and "took the money and left with it".

A rule-based knowledge base that contains domain-specific rules can enable automatic generation of contrary assumptions. For example, a rule that specifies that numbers in assumptions be adjusted up and down could generate "four bank robbers" and "two bank robbers" as contrary assumptions to the "three bank robbers" assumption. Likewise, other rules might generate contrary assumptions of "pretended to threaten customers and staff with weapons" and "threatened customers and staff with fake weapons", "hid the money and left", "took only part of the missing money and left". Such automatically generated contrary assumptions can incorporate learning from many prior events as well as rules generated by methods such as Delphi, crowd-sourcing, etc. Such automation can assist less experienced analysts in producing better results, and can assist all analysts in avoiding bias in their consideration of alternatives. Auto-generation of contrary assumptions also reduces analyst workload, time to completion, errors, and resistance to using the technique.

A rule-based knowledge base can also be helpful in the generation of indicators related to generated hypotheses. By parsing each hypothesis for key terms, and using these to select relevant rules based on past events, SME input, Delphi techniques or other methods, rules can be used to suggest potentially useful indicators, or be used to automatically rate indicators suggested by analysts. Such automation is unlikely to be perfect, and will occasionally generate incorrect results that in some cases will be wildly incorrect, but these situations will be obvious to analysts, who can simply eliminate the incorrect indicators. For example, if the automatic generation of indicators for a bank robbery suggests that the spending habits of bank staff be watched for sudden increases, analysts will recognize that as a reasonable indicator for a hypothesis involving staff assistance in the robbery, or one involving a clerk helping himself to some of the cash during the robbery. However, if the system generates an indicator that suggests that bank auditors be watched for spending pattern changes, analysts will recognize it as an erroneous indicator and delete it. Likewise, if the system rates the clerk-watching indicator as not useful, analysts will recognize this as an error when the indicator sorts low during processing.

Analyst input of contrary assumptions is prompted for by the QC automated analytic. Prompting can be to individual analysts working alone, or prompting can be to the entire team, or to subsets of the entire team, when analysts are collaborating on contrary assumption input. Addition of contrary assumptions to the QC automated analytic in some exemplary embodiments can require that they be input by analysts with a suggestion role or rule-based authority, and in some exemplary embodiments also require approval by analysts with a reviewer role or rule-based authority to review such inputs before the inputs become available for use. As with other types of information elements, alternatives input by analysts can be tagged as needed to maintain required compartmentalization of information.

When analysts do not work as a complete team to enter contrary assumptions, the system collects the various individual sets of contrary assumptions to enable presentation of a collected team set of contrary assumptions from all analysts. Information elements in the collective set can be filtered as required to maintain compartmentalization, based on the tags assigned to each contrary assumption. The sharing of contrary assumptions, and optionally, the review of the contrary assumptions in a collaborative and filtered environment, materially improves the outcomes of the QC automated analytic.

Since exemplary embodiments support the automatic transfer of hypotheses between the QC automated analytic and the ACH and MHG automated analytics, it is possible to select a hypothesis in the ACH automated analytic, use it in the MHG or QC automated analytics as an input hypothesis, transfer the generated hypotheses back into the ACH automated analytic for evaluation against known relevant information, select a new lead hypothesis and pass it back through the MHG or QC automated analytics to generate still more hypotheses. This looping can continue until no additional valid hypotheses are being generated, at which time it is likely that all useful hypotheses have been generated and these can then be considered by automated analytics such as the ACH automated analytics in order to determine the best one in light of the relevant information.

The number of hypotheses generated by the looping approach just described can be quite large. Running the generated hypotheses through the ACH automated analytic to sort them by relevant information support, and prioritize them by means such as ease of checking the associated indicators or the severity of the consequences of failing to consider them, can be used to direct efforts in the most useful directions, while not discarding the harder to evaluate or less well supported hypotheses. The original QC automated analytic did no such prioritizing or sorting. By using exemplary embodiments of the invention as part of the QC-ACH loop, collaboration between analysts is enabled, while avoiding harmful effects, such as influence from certain analysts that might affect others, or biases resulting from the order of consideration of possibilities, from adversely affecting the conclusions.

Since the QC automated analytic develops indicators for each hypothesis generated, the indicators can remain associated with their hypotheses as they are fed back into the ACH automated analytic. This can provide assistance in acquiring additional relevant information in the ACH automated analytic, such as when there is insufficient relevant information that is diagnostic, and for evaluating hypotheses in the IV automated analytic.

Collaboration can also be incorporated into the QC automated analytic in some exemplary embodiments to further reduce the workload of individual analysts, limit biases, and to stimulate team interaction. When a large number of contrary dimensions are being considered, analysts can be divided into collaborative subsets of the team members and each subset can be assigned a different set of 2×2 matrices to work with. An algorithm can be used for sorting the matrices to maximize the number of contrary dimensions each subset is exposed to and must consider. Alternatively, the ACH automated analytic's survey technique can be used, where all analysts review all matrices, but matrices are presented to each analyst in a unique order, and the results are combined into a group consensus matrix set for hypothesis generation. Likewise, hypothesis generation can be done by dividing the work between analysts or subsets of team analysts, working as a complete project team, or by analysts working individually. When done by dividing the work between analysts or groups of analysts, overlap can be incorporated, where a plurality of analysts or subsets process some of the same matrices to maximize the variety of stories and the resulting hypotheses.

The QC automated analytic can be used to quickly generate large numbers of plausible, mutually exclusive hypotheses, in a manner that is not easily subject to analyst bias, and that cover a wide range of possibilities. By providing automated support to analysts employing the QC automated analytic, and by promoting collaborative use of the method, exemplary embodiments of the current invention reduce analyst workload, reduce the opportunity for errors, maintain compartmentalization of information throughout the QC automated analytic process, and encourage wider deployment of this method of hypotheses generation to enhance the quality of analytic conclusions by enabling the consideration of a larger variety of less biased hypotheses.

6.3.4.4 IV Automated Analytic

Indicators, as described above, can be useful for acquiring relevant information for use in ACH processing. Some indicators will provide information relevant to a single hypothesis, while other indicators will be less specific, and will produce information relevant to a plurality of hypotheses. How specific the relevant information generated from monitoring an indicator is with respect to a single hypothesis is referred to as its "diagnosticity". A high diagnosticity value means that relevant information produced by monitoring an indicator is specific to one, or a very few, potential hypotheses, while a low diagnosticity value means that an indicator is associated with many, most, or even all hypotheses being considered. The IV automated analytic provides a set of automated methods for determining the diagnosticity of indicators and assisting with a determination of whether additional indicators are needed for one or more hypotheses. Diagnosticity can be a useful factor in determining an optimal allocation of resources for investigation and monitoring of indicators.

When there are a large number of indicators used in an analysis project, there is a need for automated assistance for tracking changes in, or emergence of, indicators over time, determining which indicators produce relevant information and which do not, maintaining the current state of diagnosticity for each indicator as hypotheses are added or removed, and maintaining the relative rankings of indicators for allocation of investigation resources, all while maintaining compartmentalization of information.

Figure 9:
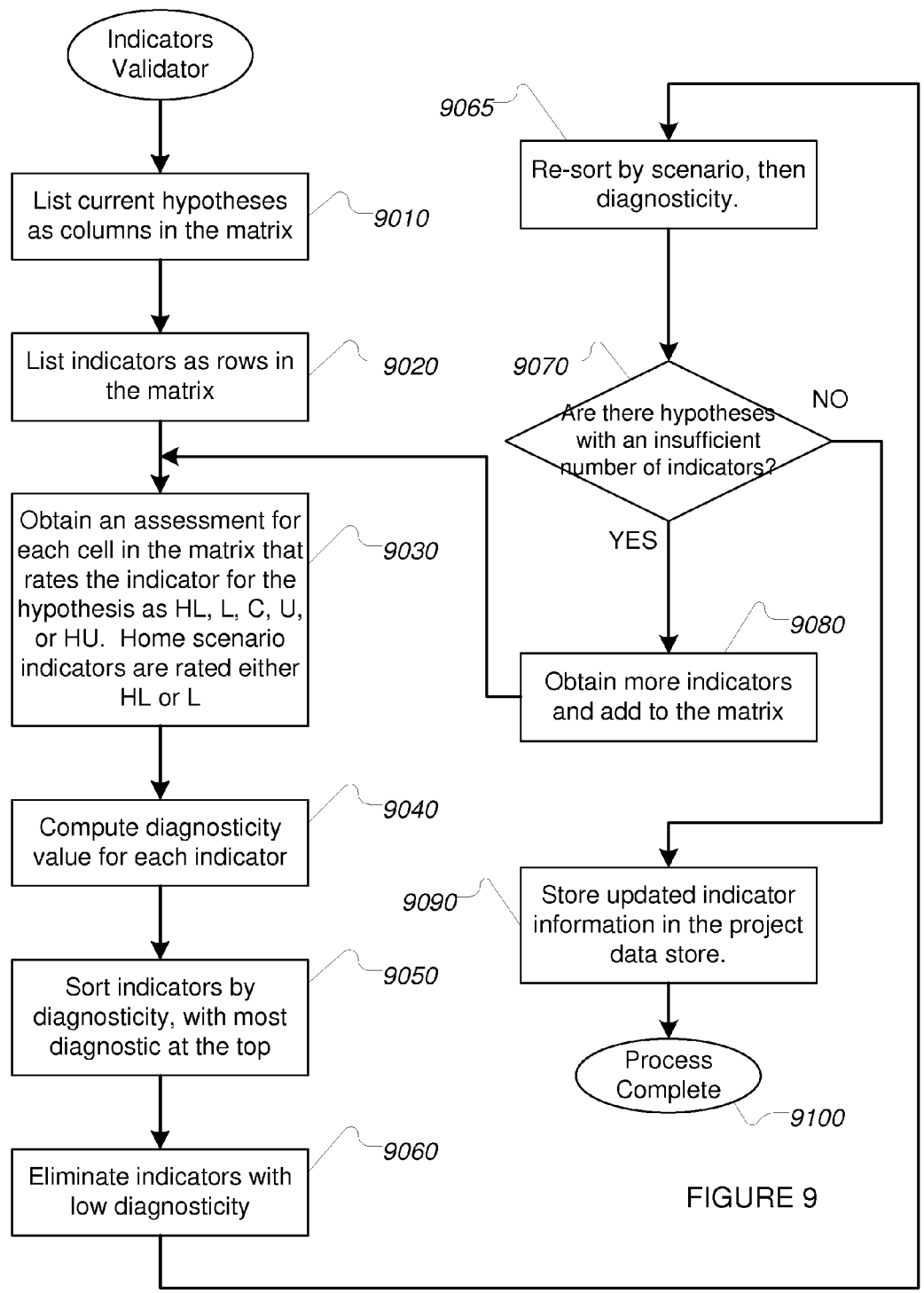
FIG. 9 is a flowchart of the steps of the IV automated analytic component of an exemplary automated structured analysis system, in accordance with one embodiment of the present invention.

FIG. 9 describes the steps used in the IV automated analytic. First, a matrix is generated, where hypotheses under consideration are displayed at the heads of the columns across the top (9010), and indicators are displayed down the left side, marking the rows (9020). Indicators are grouped by the hypothesis they are associated with. For example, if there are three hypotheses, A, B, and C, and hypothesis A has three indicators, and hypothesis B has three indicators, and hypothesis C has two indicators, the matrix might appear similar to the one shown in FIG. 10 (10000). The three hypotheses are displayed across the top (10010, 10020, & 10030) and the indicators are displayed down the left side (10040) as A1, A2, A3, B1, B2, B3, C1, and C2, in that order. For a given hypothesis, the set of indicators associated with it are known as the "home indicators". For hypothesis A, these are A1, A2, and A3 (10070). For hypothesis B, these are B1, B2, and B3 (10080). For hypothesis C, these are C1 and C2 (10090).

Returning to FIG. 9, the next step is to have the analysts rate each indicator as to consistency with each hypothesis (9030). That is, how likely the indicator is to appear, change, or take on a particular state if the given hypothesis has occurred, is occurring, or is about to occur. For home indicators the ratings will be either "Highly Likely" (HL) or "Likely" (L). If the indicator isn't likely, or highly likely, to indicate the particular hypothesis, it wouldn't be a home indicator for the hypothesis. When rating indicators that are not home indicators, such as when rating indicator A1 against hypothesis B in FIG. 10, the ratings can be Highly Likely (HL), Likely (L), Could be (C), Unlikely (U), or Highly Unlikely (HU). Each rating is associated with a value that varies depending on whether the home indicator in a row is HL or L. FIG. 10 also shows two value tables that hold these ratings (10100 & 10200). When the home indicator in a row is HL, the table on the left (10100) provides the values associated with the remaining indicators in the row. When the home indicator in a row is L, the table on the right (10200) provides the values associated with the remaining indicators. The values for each indicator in a row are added to compute the diagnosticity of the indicator (9040) and these are recorded in the score column (10060). The higher the total, the higher the diagnosticity of the indicator. The lower the total, the lower the diagnosticity of the indicator.

Once the diagnosticity scores have been computed for all indicators, the indicator rows are sorted by diagnosticity, with the most diagnostic indicators are the top (9050). Indicators with low diagnosticity (i.e. they are indicators that will appear, change similarly, and/or take on the same value for all hypothesis) are eliminated (9060). The remaining indicators are then sorted by hypothesis, and then diagnosticity (9065). If any hypothesis no longer have a sufficient number of indicators with sufficiently high diagnosticity scores, in the opinion of the analysts (9070), additional indicators are determined and added to the matrix (9080) and the process is repeated, otherwise the updated indicator information, such as diagnosticity, the ratings assigned by analysts, etc., is stored (9090) in the project information store and the process is complete (9100).

At least some exemplary embodiments of the current invention comprise an automated analytic to assist with the validation of indicators using the IV automated analytic, described above. The IV automated analytic provides a structured mechanism for validating indicators, calculating their diagnosticity, and assisting with sorting indicators for optimal use of resources for investigating or monitoring them for emergence or changes in their state. The IV automated analytic provides automated assistance to reduce analyst workload, maintain compartmentalization of information, support filtering and weighting of inputs and outputs, and record actions for future review or use in assessing the quality of the results.

Exemplary embodiments of the current invention's IV automated analytic provide automated support for input of indicators generated by other automated analytics, such as the QC automated analytic, sorting of indicators by the hypothesis they were first associated with, construction of the IV matrix with indicators in rows, and hypotheses in columns, and individual or collaborative input of analyst assessments of indicator consistency with each hypothesis with automatic calculation of the resulting diagnosticity values, sorting of indicators by diagnosticity, inclusion of incorporation of rule-based weighting factors, while maintaining compartmentalization of information.

In some exemplary embodiments, artificial intelligence techniques, such as expert systems, rule-based knowledge bases, pattern matching, or others, can be used to suggest consistency ratings. For example, if a hypothesis deals with movement of shipping containers by rail, an indicator based on weather at sea would be inconsistent, and this type of conclusion can be determined automatically in at least some cases. Such automated rating of consistency can speed up the work of rating all cells in an IV matrix, as well as reducing analyst errors when the automatic consistency rating is used only as a suggestion.

In some exemplary embodiments, indicators with diagnosticity values below a specified threshold value are displayed differently from those above the threshold, and are not considered for monitoring or investigation. Such indicators are retained however, both for historical tracking and because changes in the hypotheses being considered, or in analyst assessments of the consistency of an indicator with a hypothesis can alter the diagnosticity of the indicator and possibly move it above the threshold value.

In other exemplary embodiments, indicators have their diagnosticity values examined automatically to determine if they are "clustered" . . . that is, they are in distinct groups where the indicators making up a group have intra-group diagnosticity values that differ by a small amount compared to inter-group diagnosticity value differences. If the indicators are clustered into two distinct groups, the group with the higher diagnosticity values is retained as useful, and the group with the lower diagnosticity values is not considered for monitoring or investigation. If there are not two distinct groups the threshold technique described above can be used to determine which indicators are useful.

As indicators produce relevant information, and this information is added to a project's information store, audit logging will record the addition of the relevant information. At least some exemplary embodiments also record information as to which indicator or indicators produced the relevant information, and to determine which indicators are most productive of relevant information. The results of such determinations can be used to determine specific indicators to suggest in future analytic projects, or as additional input into rating of indicators for determining allocation of investigatory resources.

7 IMPLEMENTATION

The invention can be implemented in digital electronic circuitry, or in computer hardware, firmware, software, or in combinations of them. Apparatus of the invention can be implemented using a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and output to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to devices, systems or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

A number of implementations of the invention have been described. Nevertheless, it will be understood that various modifications can be made without departing from the spirit and scope of the invention. Accordingly, other embodiments are within the scope of the following claims.

8 EXEMPLARY USE—AN EPIDEMIC INVESTIGATION

To provide an example of how the invention might be used, the following hypothetical situation has been created. The situation is described, the analytic team is described, and then the process of analyzing the situation using an exemplary embodiment of the current invention is described. As will be apparent to those who have understood the above disclosure, the described exemplary embodiment is only one embodiment of the invention, and should in no way be seen as limiting on other exemplary embodiments.

8.1 The Situation

A number of people have been falling ill, with some dying, in a limited geographic area near a military base that stores secret "special munitions" and where secret weapons development is done. The people who are getting sick are all residents of a nearby town. There are also mining operations in the area that have been in existence for several decades, with poorly supported accusations that the local groundwater supply has been affected. There has been a drought for the prior two years, following a five year period of abnormally high rainfall. This has resulted in an increase in the local rodent population, who are now invading human-inhabited areas looking for food.

The state health authorities have requested assistance from the Centers for Disease Control (CDC), which has sent a medical investigation team to work on the problem. The CDC team, due to the potential involvement of the military base research facility, has requested assistance from the Department of Defense (DoD), which has assigned some of its own experts, both medical and engineering, from the nearby base to assist with the military's security aspects of the investigation. Due to the potential for the event to be a terrorist attack rather than an accident, the FBI has assigned an agent to monitor the investigation from Washington and report back if any indications of terrorism are discovered.

8.2 Investigation Team Grouping

The assembled investigation team is divided into several groups, based on security classifications, medical expertise, terrorism expertise, and experience with structured analytic methods in this type of investigation. Some analysts are members of more than one group. Group membership is used in several ways, both to advance the investigation and to maintain required security.

A "military" group is created for the DoD team members. Membership in this group will be used to control access to information, where the military group will have access to relevant restricted military information, while the other groups will not. Only the DoD team members will be members of this group. All information elements that include restricted military information or concepts are tagged as "military-restricted" and rules are created to limit viewing and use of items tagged "military-restricted" to members of the "military" group, so that they will be viewed and manipulated only by members of the military group.

A "medical" group is created for those with medical expertise. Medical group membership will be used for adding weight to ratings by medical group members, when the rating involves a medical issue. All medical experts (state, CDC, or DoD) will be members of the medical group. Hypotheses, relevant information, and indicators that require medical expertise to fully understand are tagged with a "medically-related" tag. This is used in the rules created for the purpose to grant extra weight on judgments relating to these items to members of the medical group.

A group named "CSI" is created for the FBI agent. CSI group membership grants permission to view various system outputs and participate in discussions with other investigation team members, but does not grant permission to enter any other inputs to any aspect of the system (MHG, ACH, QC, or IV). Should indications that terrorism or other criminal activity is involved begin to surface, the permissions for this group will be changed to permit fuller participation, but until such time, the CSI group member is just an observer.

An "expert" group is created for those team members with successful experience with use of structured analytic techniques in this type of investigation and using the system of the invention. Expert group membership is used to add weight to all ratings made by its members.

In addition to the military, medical, CSI and expert groups, there are other standard groups that are automatically generated by the system for a project, such as an "owner" group for the project owner(s), an "admin" group for those with permission to make changes to the configuration settings for the project (such as defining or editing rules) or to group memberships, and an "ex-member" group for those members who have left the investigation team. Using the ex-member group to record departed team members permits the departed member accounts to remain in place so that discussion references, ratings, other group memberships, etc. made before departure remain valid and available to the remaining team members with the required permissions to view them (e.g. if a discussion entry is made in an ACH cell visible only to members of the military group, members of the military group would continue to have access to the discussion entry, but other team members who are not in the military group would continue to see nothing, or to see an alternate entry display, depending on how the system is configured. Discussion entries made in areas that are visible to all team members would continue to be visible to all team members). Membership in the "ex-member" group disables all access and actions on the project. Should the member return to the team, simple removal from the ex-member group returns them to their prior status.

The owner of the project, i.e. the person leading the investigation or someone appointed by them, creates the project in the system, defines the needed non-default groups, defines initial tags for use in characterizing relevant information, hypotheses, and other information elements, and sets up the rules used to specify privileges granted to the defined groups, judgment weighting factors associated with defined groups, filtering of displayed information, hypotheses, or other information elements, thresholds for cut-off or clustering decisions, and other required project configuration settings and definitions.

8.3 Example Investigation Using the Invention

The first step for the team membership as a whole is to collect all relevant information, and to tag it appropriately. Tagging is used on information elements to permit the automated analytic to reference tagged items as item classes for various purposes, such as filtering for view suppression, references in rules used to assign weightings, decisions about which QC matrices to assign to which groups, etc. Tagging of relevant information is usually done at the time the information is entered into the system, but an appropriately privileged team member, such as the project owner, can add or remove tags at any time there is need to do so. In the example investigation we are considering, all restricted military information is tagged as "military-restricted", and information that requires medical training to comprehend properly is tagged "medically-related". Where viewing or manipulation of relevant information must be restricted to a specific group or groups, members of the group or groups perform the information entry and tagging. When viewing and manipulation is permitted by all investigation team members, any analyst can enter and tag relevant information, unless there is a privilege restriction that prevents it. For example, the project owner could create a rule that permits relevant information to be entered only by the project owner, or only by a member of an "admin" group, or by a special "information entry" group. By defining privileges and restrictions using groups and rules set up for each project, great flexibility is made available for permitting or restricting capabilities on a project by project basis. Each project can be set up as its needs dictate.

After gathering and tagging what relevant information is already available, the team needs to generate as many hypotheses for the cause of the illnesses as they can. They will then compare each hypothesis against the relevant information using the ACH automated analytic to determine which hypotheses are most inconsistent with the relevant information and therefore unlikely to be valid. If a complete set of hypotheses are generated, and all but one can be ruled out by being inconsistent with relevant information, it is likely that the remaining hypothesis is correct. Using relevant information to eliminate all but one hypothesis, and confirming that the one remaining hypothesis is correct is the goal of the investigation. To generate an initial set of hypotheses, the team decides to use the MHG automated analytic.

The MHG automated analytic requires a hypothesis, issue, activity, or behavior to process. Typically a lead hypothesis is selected for this (one that it is felt by team members to be the most likely hypothesis). The team members each have some opinions as to what the cause of the illness might be, given the relevant information already known. They meet, in person and/or through the analyst discussion feature and share their candidate hypotheses. After some discussion, the team decides to select the hypothesis that there has been a leak of toxic or biological materials from the military base that is affecting those in the vicinity. The characteristics (e.g., the who, what, where, when, why, and how) of this hypothesis are then requested by the system, determined by the analysts, and plausible alternatives determined and input into the system:

Who is responsible for the leak: a researcher, a technician, an unknown party.

What is leaking: a toxic substance, a biological . . . details of possibilities are restricted to the military, and known only by those in the military group.

Where is the source of the leak: the military base research labs, the military base material storage area, a vehicle delivering materials.

When did the leak occur: Over a long period of time, beginning in the recent past, a one-time release.

Why did the leak occur: Accident, ignorance, experiment, sabotage.

How is the leaking material reaching the victims: Through the air, through the ground water, through personal contact, through escaped lab animals.

All permutations of these alternatives are then generated by the system. For example, a researcher released a toxic substance at the research labs into the air over a long period of time by accident (such as through a piece of faulty equipment). A researcher released a toxic substance at the research labs into the air over a long period of time through ignorance (i.e. didn't realize it would persist long enough to cause harm). The number of permutations can be large, and automated generation of all possible combinations is very efficient and greatly speeds up the process. The MHG automated analytic performs this task automatically, and presents the set of resulting permutations for evaluation.

Those generated hypotheses that involve restricted military information are tagged as "military-restricted", and visible only to those in the military group. In some exemplary embodiments, the system automatically propagates tagging from the alternatives used to construct a generated hypothesis to the generated hypothesis so as to preserve compartmentalization of information. In some other exemplary alternative embodiments, tagging is propagated manually by analysts. In yet other exemplary alternative embodiments, tagging is propagated according to defined rules.

Once all hypotheses are generated, each team member rates each hypothesis that is visible to them as to credibility on a zero to five scale, where a zero means the hypothesis is illogical or makes no sense and should be discarded, and one to five refer to increasing levels of credibility. The credibility ratings are then averaged to calculate a credibility score. Those with a credibility score of zero, i.e. rated as illogical or not-sensible by all team members with permission to access them, are discarded. Discarded hypotheses are retained by the system for audit purposes, but are not made available to the ACH automated analytic for evaluation and play no further part in the analysis. The remaining hypotheses are sorted by credibility score, and a cutoff threshold is used to determine which hypotheses are most deserving of attention and these are automatically loaded into the ACH automated analytic for evaluation against relevant information.

In the ACH automated analytic, the hypotheses generated with the MHG automated analytic, as well as any others input by team members with permission to add hypotheses, are matched against the currently known relevant information, and rated for consistency. The rating technique comprises determining whether each item of relevant information is very consistent with, consistent with, inconsistent with, very inconsistent with, or neutral to each hypothesis.

As each analyst is rating relevant information against hypotheses in their personal ACH matrix, they are shown only those hypotheses and items of information that the compartmental restrictions permits them to see and work with. What each team member is shown is based on the most permissive compartmental restrictions for the team member. For example, if relevant information is restricted to members of the military group, a member of the medical or CSI groups would be unable to view or work with it, unless that person is also a member of the military group. Their membership in the medical or CSI group does not disqualify them from viewing the restricted information, but it does not qualify them either. Only membership in the military group does that, under the rules defined for this project.

In some embodiments, compartment restrictions can restrict access to an analyst's personal ACH matrix. For example, the restrictions may permit display of the matrix, to allow discussion about cells in the matrix, but not allow rating cells or engaging in other activities. The CSI group members have this sort of permission configuration. This allows the FBI team member to follow the progress of the analysis, to see the hypotheses under consideration and to view the relevant information, and to participate in discussions about these, but not to affect the course of the analysis directly by adding hypotheses, rating relevant information against them, or identifying assumptions or indicators. Compartment restriction is also used to restrict rating of medical hypotheses or medically relevant information by non-medical team members, such as the DoD engineers, while permitting them to see those hypotheses or information, or to make comments about them during discussions.

Group membership can affect how a member's ratings are used when calculating diagnosticity or when making other calculations. When a hypothesis, item of relevant information, or other item is tagged as being "medically-related", members of the medical group receive an increased weight for their ratings. Members of the "expert" group receive an adjustment for their ratings regardless of how the item is tagged. A member of both medical and expert groups would have their ratings adjusted by both weights. The amount of adjustment, and whether it increases or decreases a calculated value, is determined by the rules defined in the project configuration, which is set by someone in the "owner" group. Members of the owner group also configure which group or groups the weighting applies to. Not all groups effect weighting. For example, membership in the military group conveys no weighting factor.

When the group matrix is displayed, the content is limited to hypotheses, relevant information, combined ratings, discussions, etc. that are viewable by all team members, unless a team member with permission to do so specifically requests additional information be included. When making such a request, the team member can specify which additional group memberships should be used to determine what to include. The available options for group memberships will include only those possessed by the requesting team member. For example, if relevant information element A is tagged as military-restricted, it will not be displayed unless a team member who is a member of the military group requests it. If a hypothesis is restricted to either military or expert group members, and a team member who is a member of both groups is making a request to display additional information, the team member can specify that display be based on either group membership. Such requests to override default displays are logged, and can require a specific acknowledgement of intent (i.e. "Please confirm override of security restriction on display of military-restricted information", with a requirement to enter an authentication to prove group membership in the military group before the information is displayed).

When a hypothesis or item of relevant information is suppressed in either the group matrix or in a personal matrix, it is replaced by an alternate version. The alternate version indicates that the information element is being suppressed, and why. For example, "Hypothesis requires military group membership for viewing", or "Item of restricted military information viewable only by military group members". In some embodiments, an alternate description can be specified for restricted entries when viewed by those not possessing membership in a required group. For example, "Military hypothesis alpha", or "Accidental spill of toxic chemical", rather than the more specific hypothesis description that would be shown to someone in the required group, such as "Accidental release of substance X-148 from building 12 on or about September 12". The text of the alternate description is in red to indicate that the actual description is being suppressed.

Once ratings have been applied, diagnosticity calculated, and hypotheses sorted, selected hypotheses can be made available to the QC automated analytic for use in generating additional hypotheses. Selected ones of the generated hypotheses can then be returned to the ACH automated analytic for evaluation against relevant information to see which are consistent with known information and which are not.

Where there is insufficient relevant information with high enough diagnosticity value, indicators can be specified and made available to the IV automated analytic where they will be rated for diagnosticity and sorted into a priority ordering. Selected indicators can also be investigated or monitored to generate additional relevant information for inclusion in the ACH matrix.

To increase the chance that all valid hypotheses are being considered, team members select hypotheses from the ACH matrix and send them to the QC automated analytic. The QC automated analytic generates additional hypotheses by breaking a selected hypothesis into its component assumptions, generating contrary assumptions for each assumption, and then putting pairs of contrary assumptions into two-by-two matrices in all possible combinations. Team members then concoct at least one plausible story for each quadrant of each two-by-two matrix, and then identify indicators for each resulting hypothesis.

When the initial hypothesis made available to the QC automated analytic is restricted as to which team members can see it, only those team members who participate in the QC automated analytic may participate in rating the matrix. For example, if the hypothesis chosen is that there was an accidental release of substance X-148 from building 12 on or about September 12, only military group team members participate. If the hypothesis is not restricted, such as a hypothesis that it is a naturally occurring illness being spread by rodents that happen to live in the tribal lands, all team members can participate.

Even when all team members can participate, there can be reasons for limiting participation to a subset of team members. For example, to shorten the total time to process all of the top hypotheses through the QC automated analytic, the team can break into smaller sub-teams and do them in parallel. Or if understanding a particular hypothesis involves specialized knowledge, a group made up of those with the most expertise in that area can deal with that hypothesis. In this example case, the military group members deal with the hypotheses that are restricted to their group, while the other team members deal with the unrestricted hypotheses.

Since some of the hypotheses deal with sabotage, which could be terrorism-related, adjustments are made to the group permissions to allow the CSI group member to participate, so that the team can have the benefit of FBI input into the formation of contrary assumptions and story creation.

The resulting stories are re-formulated as valid hypotheses and sent back to the ACH automated analytic for evaluation against relevant information, while any indicators generated for the hypotheses are made available to the IV automated analytic for validation and prioritizing.

Indicators, whether from the ACH or QC automated analytics, or those input by appropriately authorized team members, need to be evaluated to make sure that they are diagnostic, and prioritized so that limited resources are used in the most effective manner. This is done using the IV automated analytic.

Indicators and hypotheses are automatically arranged in a matrix similar to that used for the ACH automated analytic, hypotheses in columns and indicators on the rows, and are then assessed for the likelihood that each indicator would occur in the associated hypothesis. When analysts rate indicators, the order of presentation can be different for each team member, using the survey techniques described above. Team members assign likelihood ratings to each cell in the matrix using the HL, L, C, U, or HU ratings of the IV automated analytic. These are used by the IV automated analytic to calculate a diagnosticity rating for each indicator. Indicators with diagnosticity ratings below a specified threshold are displayed "grayed out" to indicate that they are out of consideration for the hypotheses being considered. These nondiagnostic indicators are not simply deleted, but are retained in an inactive state so that team members will be reminded that they have already been considered. Also, should additional hypotheses be added in future, the indicators' diagnosticity rating could change and make them valid.

As with other parts of the system, those hypotheses, indicators and the associated ratings that are restricted to being viewed by specific groups within the team are visible only to those team members in those groups. For example, an indicator consisting of a test for the presence of material X-148 would be visible only to military group members, and evaluated only by them. Likewise, any hypotheses involving material X-148 would also be limited to military group member viewing. Members of other groups would, depending on configuration settings, either see nothing, or see only a substitute display, such as "restricted hypotheses #n", or "release of a military-restricted material". In some cases it can be advantageous to permit members of groups that are restricted from viewing full details of an indicator or hypothesis to nevertheless rate the indicator. This is done using the alternate descriptions. For example, the hypothesis might be shown to the restricted team members as "release of military-restricted substance #1 from the base", and an indicator shown as "detection of military-restricted substance #1". It is not necessary to know the nature of the substance to know that detection of the substance would be a highly likely indication of the hypotheses involving its release.

Also as with other parts of the system, the ratings of individual team members can be weighted, based on group membership, such that some team members have greater effect on the final indicator diagnosticity ratings than others. For example, the configuration rules can be set such that those in the "expert" group have their ratings count twice, or their individual diagnosticity ratings can be multiplied by a weighting factor before the group consensus value is calculated.

Once indicators have had their diagnosticity calculated, and those with low diagnosticity marked, the indicators are sorted into hypothesis order based on their home hypotheses, and then by diagnosticity. If there are hypotheses with an insufficient number of valid indicators, the team members will develop additional indicators and the process will be repeated for the added indicators. Otherwise, indicators are prioritized by various factors including diagnosticity, cost, likelihood of deception, difficulty of obtaining valid information, etc., and the top indicators selected for monitoring. As monitoring of indicators generates relevant information, it is added to the ACH system matrix and used to re-evaluate hypotheses.

What is claimed:

1. A computer-implemented method for providing compartmented, collaborative, integrated, automated analytics to a group of analysts to provide compartmentalized information among such analysts, comprising:
   determining the identity of at least one individual analyst or group of analysts, said determining being performed electronically using an electronic computer processor under control of electronically encoded instructions to process electronically electronic data encoding representations of said at least one individual analyst or group of analysts;
   selecting an electronically encoded contextual workflow configured to provide contextual information for the operation and use of automated analytics by analyst in addition to workflow instructions, said electronically encoded contextual workflow being defined at least in part by said identity of said at least one individual analyst or group of analysts, said selecting being performed electronically using an electronic computer processor under control of electronically encoded instructions to process electronically electronic data encoding representations of said at least one individual analyst or group of analysts;
   providing an electronically encoded set of instructions and data implementing the electronic function of a electronically encoded compartment manager, said electronically encoded compartment manager including electronically encoded information about the context of said contextual workflow, said compartment manager being configured to restrict electronic access and electronic use of information by said individual analyst or group of analysts according to the electronically encoded identity of said individual analyst or group of analysts;
   retrieving said electronically encoded information about said context of said contextual workflow, said retrieving being performed electronically using an electronic computer processor under control of electronically encoded instructions to process electronically said electronically encoded information about said context;
   selecting an electronically encoded automated analytic using said electronically encoded contextual workflow, said selecting being performed electronically using an electronic computer processor under control of electronically encoded instructions to process electronically said electronically encoded automated analytic;
   providing under control of said electronically encoded compartment manager said electronically encoded information about said context to said automated analytic, said providing being performed electronically using an electronic computer processor under control of electronically encoded instructions;
   processing said electronically encoded information using said electronically encoded automated analytic, to generate thereby analytical information representing an outcome to said analysts, said processing being performed electronically using an electronic computer processor under control of electronically encoded instructions to process electronically said electronically encoded information; and
   processing said electronically encoded analytical information in accordance with said electronically encoded compartment manager and said electronically encoded contextual workflow, said processing being performed electronically using an electronic computer processor under control of electronically encoded instructions to process electronically said electronically encoded analytical information.

2. The computer-implemented method of claim 1, wherein said contextual workflow includes at least one electronically encoded contextual attribute selected from the group consisting of: guidance to the automated analytics, as to the process to be followed, information to use as inputs, information required for outputs, and any required labeling, tagging, and compartmentalization.

3. The computer-implemented method of claim 2, wherein guidance to said automated analytics further includes electronically encoded guidance for analysts.

4. The computer-implemented method of claim 1, wherein said contextual workflow defines electronically encoded rules based upon one or more aspects of said context.

5. The computer-implemented method of claim 4, wherein said contextual workflow defines electronically encoded rules for each analyst, each project, for each installation of the system, or by the system design.

6. The computer-implemented method of claim 1, wherein said electronically encoded compartment manager executes under computer control at least one electronically encoded, computer executable function selected from the group consisting of: generating or assigning tags associated with specific information elements, or with specific types of information elements within a compartment; generating or assigning compartments associated with specific information elements, or with specific types of information elements within a compartment; managing requests to, and information elements provided by, a data store to enforce rules for information access, tagging, and association rules; assigning or associating information elements or types of information elements with specific tags, associations, controls, contexts, or compartments; assigning or associating rules with information elements or types of information elements that require specific tagging or restrictions to be applied to newly created information elements and restricting the availability of information elements or types of information elements to which a requestor is not authorized access or use.

7. The computer-implemented method of claim 1, wherein said electronically encoded compartment manager executes under computer control at least one electronically encoded, computer executable function selected from the group consisting of: implementing access controls over information elements; implementing controls over tagging and association among multiple information elements; and enforcing information segregation of information elements, including logical and physical segregation of information elements among different data stores.

8. The computer-implemented method of claim 1, further comprising providing a set of electronically encoded rules defining the scope of visibility of information, said rules being effective to define private information, restricted information, and unrestricted information.

9. A computer system for providing electronically encoded, computer executable compartmented, collaborative, integrated, automated analytics to a group of analysts to provide compartmentalized information among such analysts, said system comprising at least one electronic computer processing device configured to implement:
an electronically encoded, computer executable electronic data processing service configured to determine the identity of at least one individual analyst or group of analysts electronically using an electronic computer processor under control of electronically encoded instructions to process electronically electronic data encoding representations of said at least one individual analyst or group of analysts;
an electronically encoded, computer executable electronic data processing service configured to select an electronically encoded contextual workflow configured to provide contextual information for the operation and use of automated analytics by analyst in addition to workflow instructions, said electronically encoded contextual workflow being defined at least in part by said identity of said at least one individual analyst or group of analysts electronically using an electronic computer processor under control of electronically encoded instructions to process electronically electronic data encoding representations of said at least one individual analyst or group of analysts;
an electronically encoded, computer executable electronic data processing service configured to provide a electronically encoded compartment manager, said electronically encoded compartment manager including electronically encoded information about the context of said contextual workflow, said compartment manager being configured to restrict electronic access and electronic use of information by said individual analyst or group of analysts according to the electronically encoded identity of said individual analyst or group of analysts;
an electronically encoded, computer executable electronic data processing service configured to retrieve electronically said electronically encoded information about the context electronically using an electronic computer processor under control of electronically encoded instructions to process electronically said electronically encoded information about said context;
an electronically encoded, computer executable electronic data processing service configured to select an electronically encoded computer-implemented automated analytic using said electronically encoded contextual workflow electronically using an electronic computer processor under control of electronically encoded instructions to process electronically said electronically encoded automated analytic;
an electronically encoded, computer executable electronic data processing service configured to provide under control of said electronically encoded compartment manager said electronically encoded information about the context to said automated analytic electronically using an electronic computer processor under control of electronically encoded instructions;
an electronically encoded, computer executable electronic data processing service configured to process under computer control said electronically encoded information using said computer-implemented automated analytic, to generate thereby analytical information representing an outcome to said analysts electronically using an electronic computer processor under control of electronically encoded instructions to process electronically said electronically encoded information; and
an electronically encoded, computer executable electronic data processing service configured to process under computer control said electronically encoded analytical information in accordance with said electronically encoded compartment manager and said electronically encoded contextual workflow electronically using an electronic computer processor under control of electronically encoded instructions to process electronically said electronically encoded analytical information.

10. The computer system of claim 9, wherein said electronically encoded contextual workflow includes at least one electronically encoded contextual attribute selected from the group consisting of: guidance to the automated analytics, as to the process to be followed, information to use as inputs, information required for outputs, and any required labeling, tagging, and compartmentalization.

11. The computer system of claim 10, wherein guidance to said automated analytics further includes guidance for analysts.

12. The computer system of claim 9, wherein said electronically encoded contextual workflow defines rules based upon one or more aspects of said context.

13. The computer system of claim 12, wherein said electronically encoded contextual workflow defines rules for each analyst, each project, for each installation of the system, or by the system design.

14. The computer system of claim 9, wherein said electronically encoded compartment manager executes under computer control at least one function selected from the group consisting of: generating or assigning tags associated with specific information elements, or with specific types of information elements within a compartment; generating or assigning compartments associated with specific information elements, or with specific types of information elements within a compartment; managing requests to, and information elements provided by, a data store to enforce rules for information access, tagging, and association rules; assigning or associating information elements or types of information elements with specific tags, associations, controls, contexts, or compartments; assigning or associating rules with information elements or types of information elements that require specific tagging or restrictions to be applied to newly created information elements and restricting the availability of information elements or types of information elements to which a requestor is not authorized access or use.

15. The computer system of claim 9, wherein said electronically encoded compartment manager executes under computer control at least one function selected from the group consisting of: implementing access controls over information elements; implementing controls over tagging and association among multiple information elements; and enforcing information segregation of information elements, including logical and physical segregation of information elements among different data stores.

16. The computer system of claim 9, further comprising providing a set of rules defining the scope of visibility of information, said rules being effective to define private information restricted information and unrestricted information.

17. A non-transitory computer-readable medium containing computer-readable program control devices thereon, said computer-readable program control devices being configured to enable a computer to provide compartmented, collaborative, integrated, automated analytics to a group of analysts to provide compartmentalized information among such analysts by causing said computer to execute computer-controlled, electronically encoded operations comprising:
determining the identity of at least one individual analyst or group of analysts, said determining being performed electronically using an electronic computer processor under control of electronically encoded instructions to process electronically electronic data encoding representations of said at least one individual analyst or group of analysts;
selecting an electronically encoded contextual workflow configured to provide contextual information for the operation and use of automated analytics by analyst in addition to workflow instructions, said electronically encoded contextual workflow being defined at least in part by said identity of said at least one individual analyst or group of analysts, said selecting being performed electronically using an electronic computer processor under control of electronically encoded instructions to process electronically electronic data encoding representations of said at least one individual analyst or group of analysts;
providing an electronically encoded set of instructions and data implementing the electronic function of a electronically encoded compartment manager, said electronically encoded compartment manager including electronically encoded information about the context of said contextual workflow, said compartment manager being configured to restrict electronic access and electronic use of information by said individual analyst or group of analysts according to the electronically encoded identity of said individual analyst or group of analysts;
retrieving said electronically encoded information about said context of said contextual workflow, said retrieving being performed electronically using an electronic computer processor under control of electronically encoded instructions to process electronically said electronically encoded information about said context;
selecting a electronically encoded automated analytic using said electronically encoded contextual workflow, said selecting being performed electronically using an electronic computer processor under control of electronically encoded instructions to process electronically said electronically encoded automated analytic;
providing under control of said electronically encoded compartment manager said electronically encoded information about said context to said automated analytic, said providing being performed electronically using an electronic computer processor under control of electronically encoded instructions;
processing said electronically encoded information using said electronically encoded automated analytic, to generate thereby analytical information representing an outcome to said analysts, said processing being performed electronically using an electronic computer processor under control of electronically encoded instructions to process electronically said electronically encoded information; and
processing said electronically encoded analytical information in accordance with said electronically encoded compartment manager and said electronically encoded contextual workflow, said processing being performed electronically using an electronic computer processor under control of electronically encoded instructions to process electronically said electronically encoded analytical information.

18. The computer-readable medium of claim 17, wherein said electronically encoded contextual workflow includes at least one contextual attribute selected from the group consisting of: guidance to the automated analytics, as to the process to be followed, information to use as inputs, information required for outputs, and any required labeling, tagging, and compartmentalization.

19. The computer-readable medium of claim 18, wherein said guidance to said automated analytics further includes guidance for analysts.

20. The computer-readable medium of claim 17, wherein said electronically encoded contextual workflow defines rules based upon one or more aspects of said context.

21. The computer-readable medium of claim 20, wherein said electronically encoded contextual workflow defines rules for each analyst, each project, for each installation of the system, or by the system design.

22. The computer-readable medium of claim 17, wherein said electronically encoded compartment manager executes under computer control at least one function selected from the group consisting of: generating or assigning tags associated with specific information elements, or with specific types of information elements within a compartment; generating or assigning compartments associated with specific information elements, or with specific types of information elements within a compartment; managing requests to, and information elements provided by, a data store to enforce rules for information access, tagging, and association rules; assigning or associating information elements or types of information elements with specific tags, associations, controls, contexts, or compartments; assigning or associating rules with information elements or types of information elements that require specific tagging or restrictions to be applied to newly created information elements and restricting the availability of information elements or types of information elements to which a requestor is not authorized access or use.

23. The computer-readable medium of claim 17, wherein said electronically encoded compartment manager executes under computer control at least one function selected from the group consisting of: implementing access controls over information elements; implementing controls over tagging and association among multiple information elements; and enforcing information segregation of information elements, including logical and physical segregation of information elements among different data stores.

24. The computer-readable medium of claim 17, further comprising providing a set of electronically encoded rules defining the scope of visibility of information, said rules being effective to define private information, restricted information, and unrestricted information.

* * * * *